June 14, 1938. J. W. BRYCE 2,120,228
ACCOUNTING MACHINE
Filed Feb. 1, 1933 16 Sheets-Sheet 1
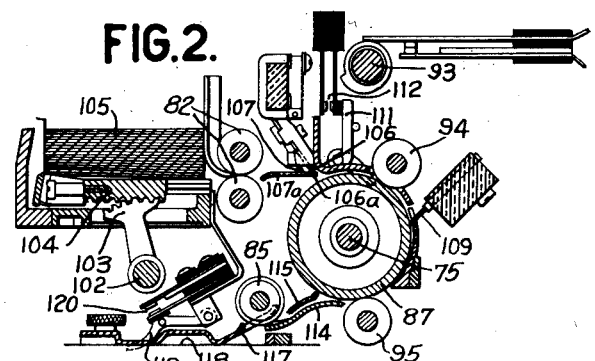
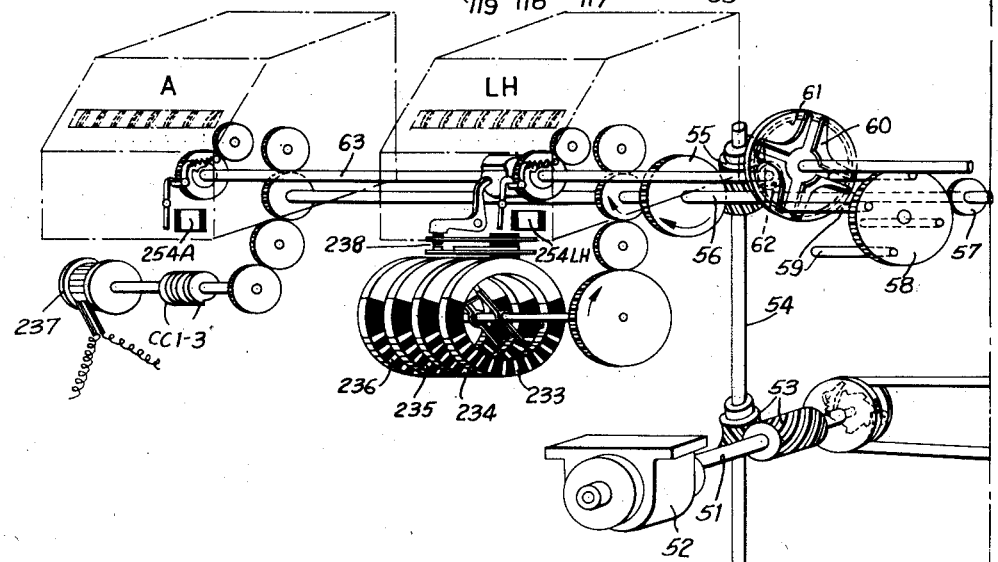
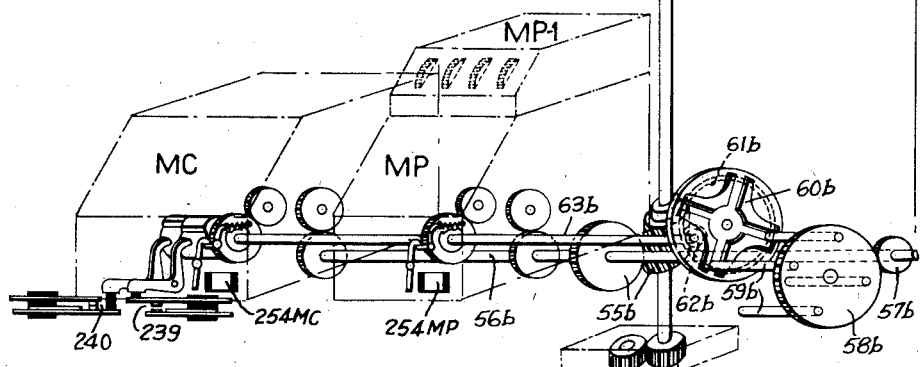
INVENTOR-
James W. Bryce
BY
Cooper, Kerr & Dunham
ATTORNEYS

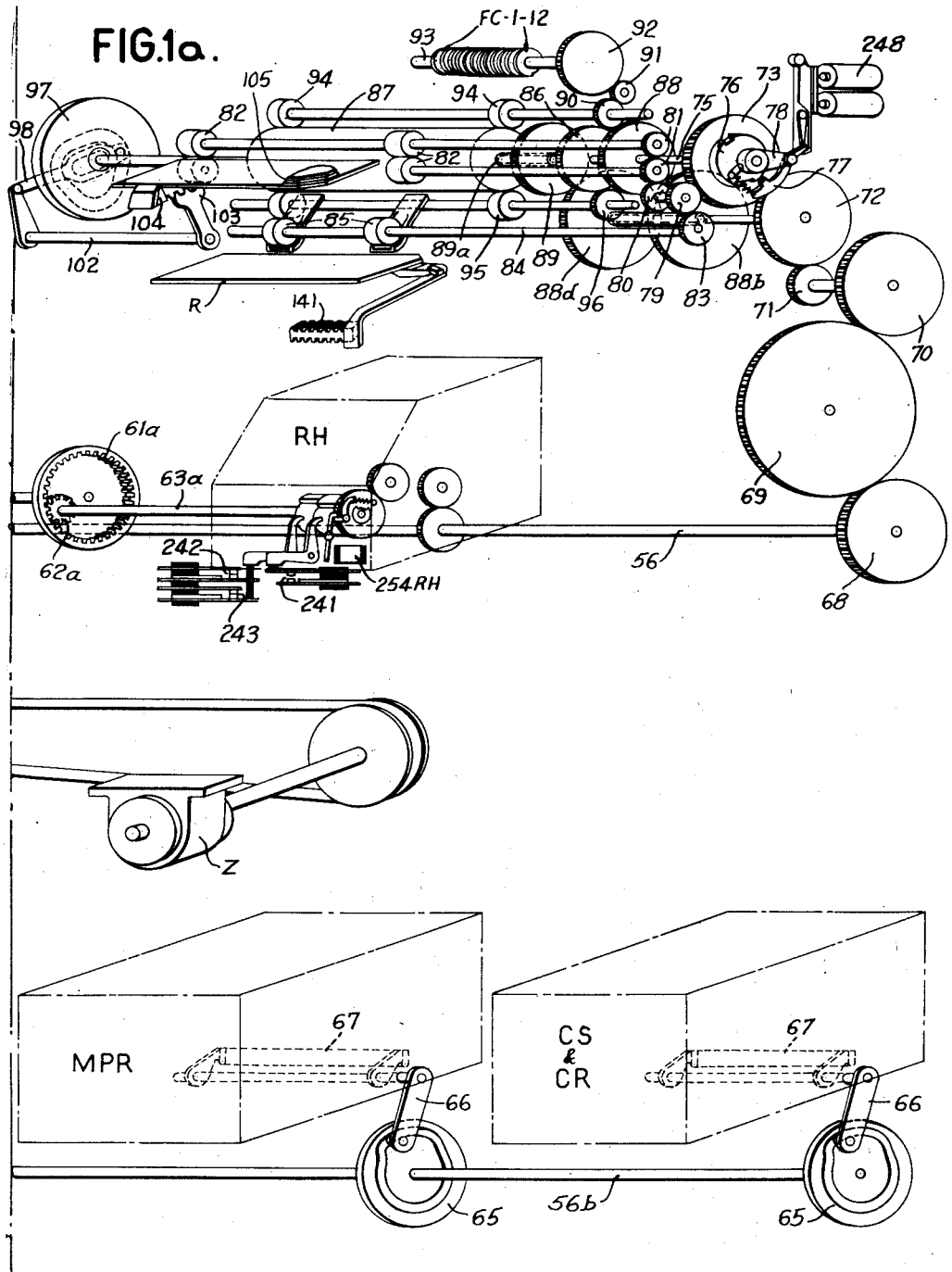

June 14, 1938.　　　J. W. BRYCE　　　2,120,228
ACCOUNTING MACHINE
Filed Feb. 1, 1933　　　16 Sheets-Sheet 3
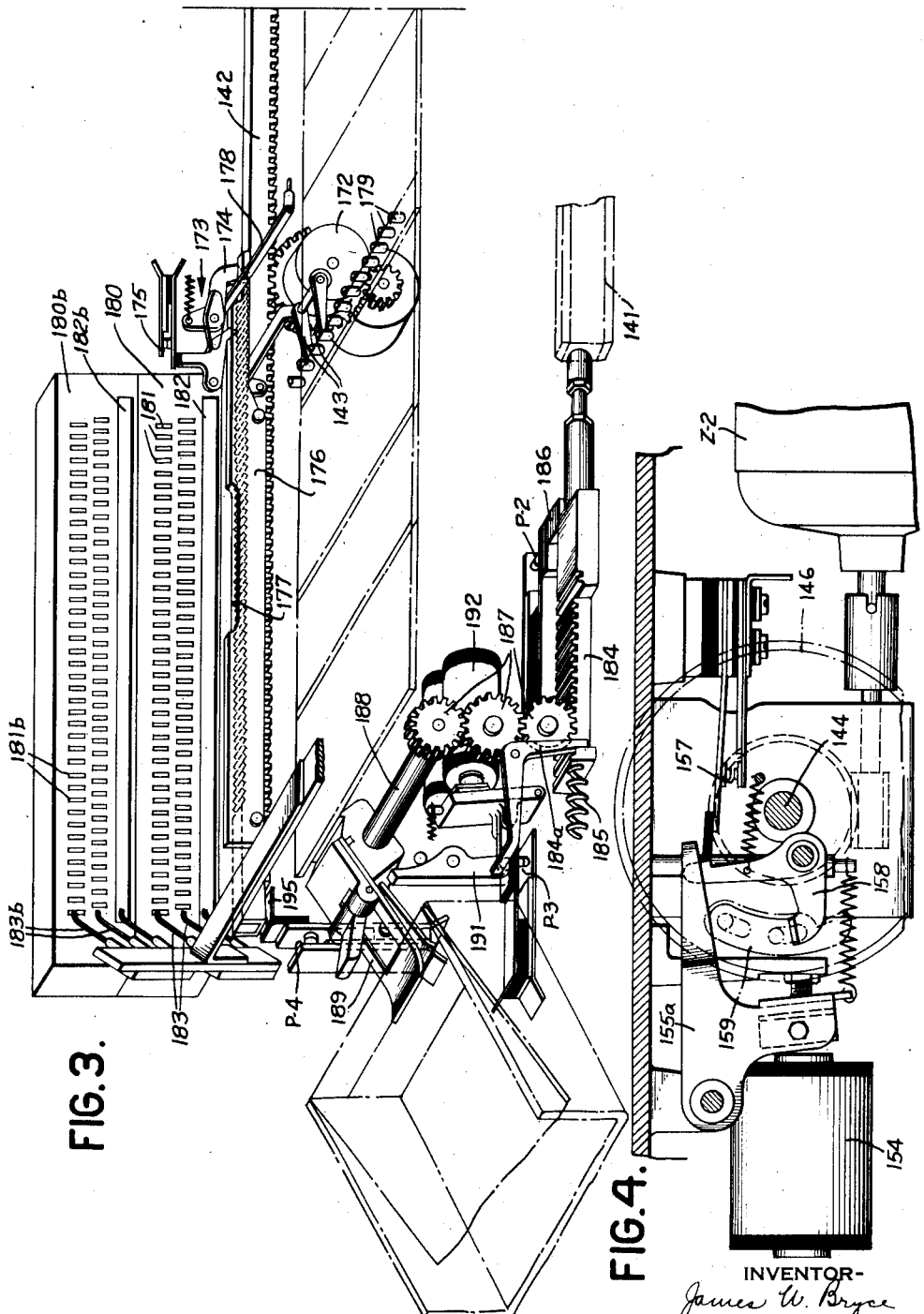

June 14, 1938.	J. W. BRYCE	2,120,228
ACCOUNTING MACHINE
Filed Feb. 1, 1933	16 Sheets-Sheet 4
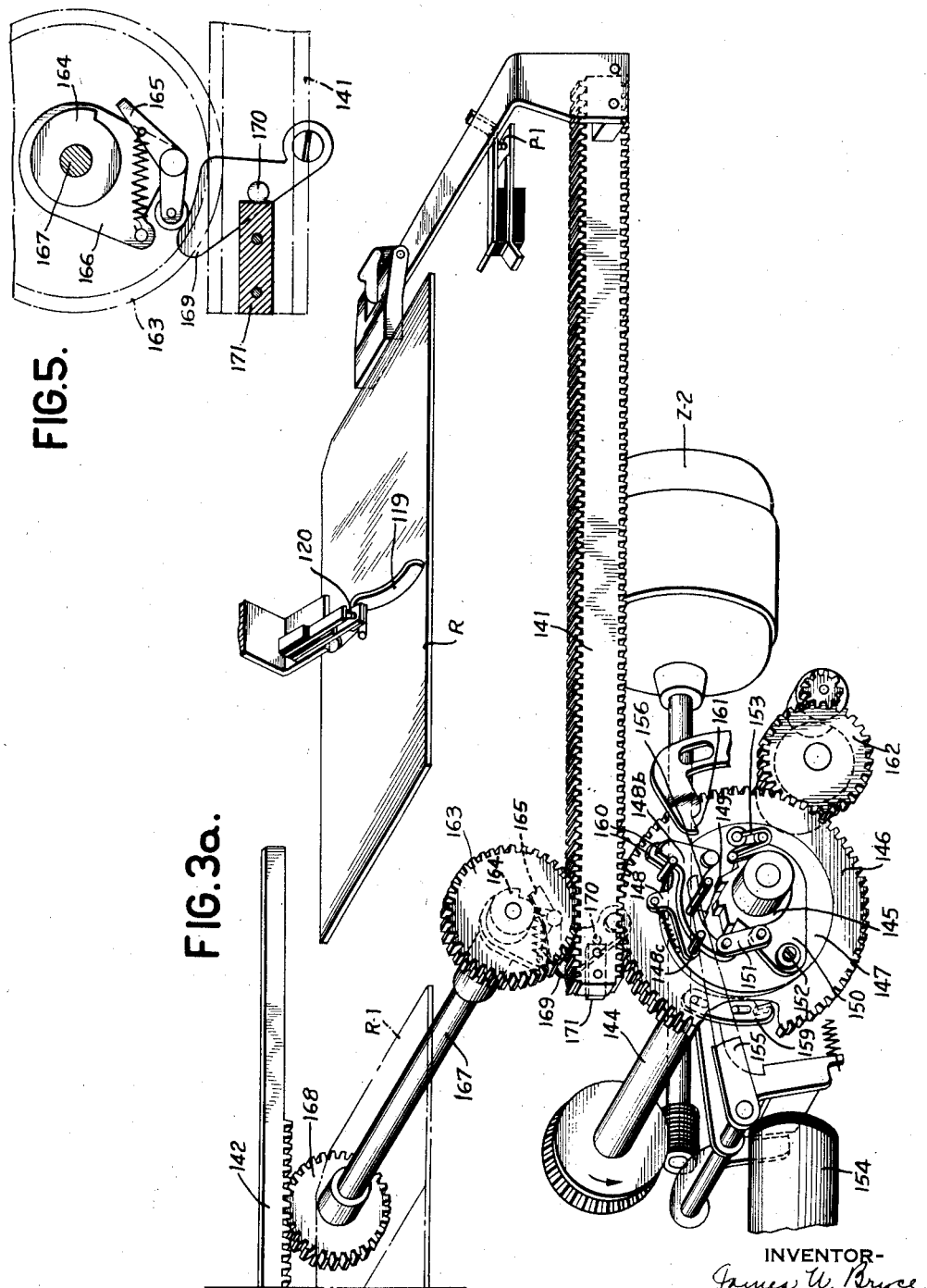

June 14, 1938.    J. W. BRYCE    2,120,228
ACCOUNTING MACHINE
Filed Feb. 1, 1933    16 Sheets-Sheet 5
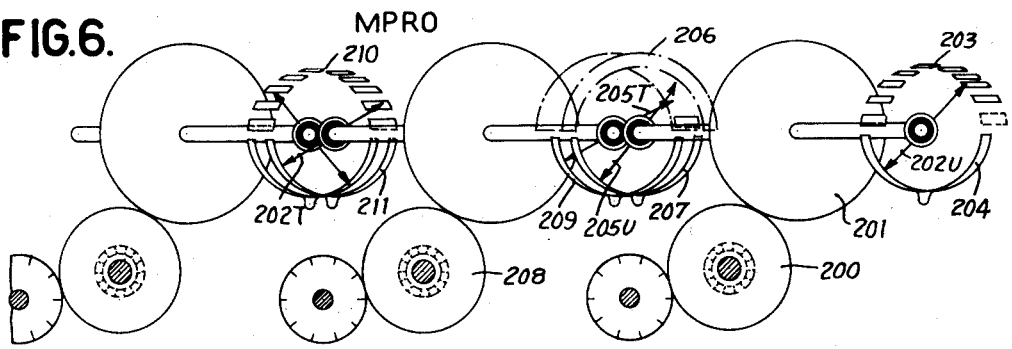
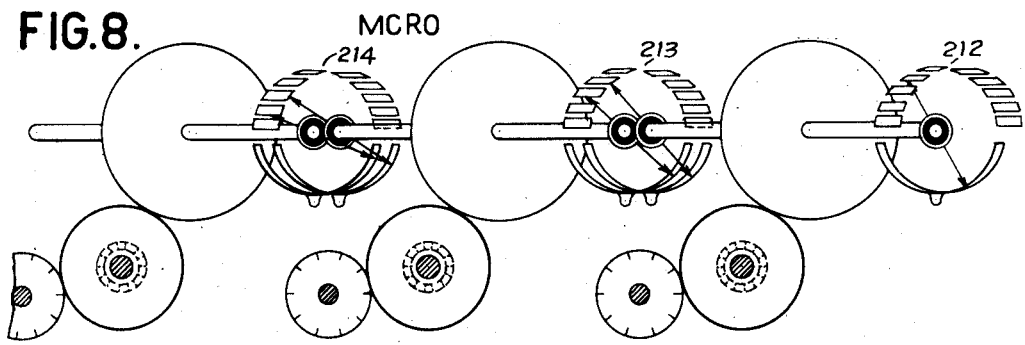
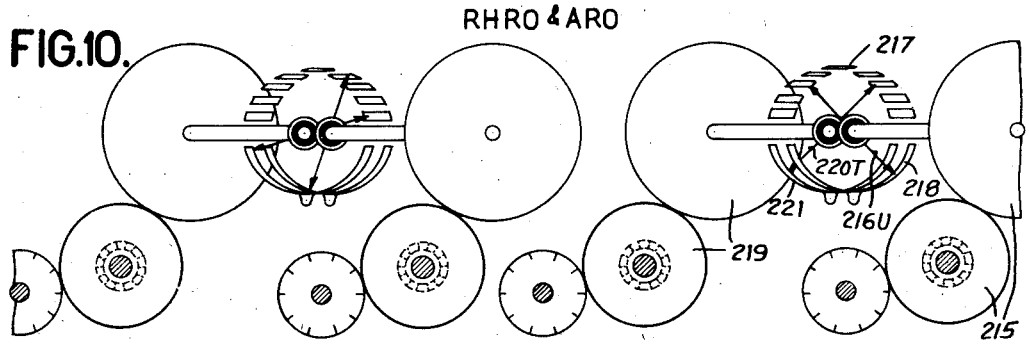
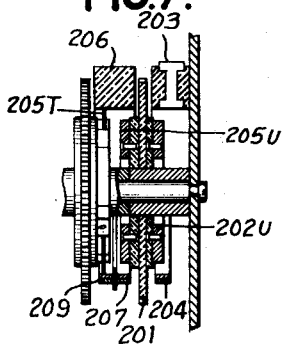
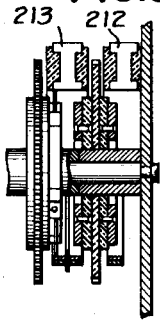
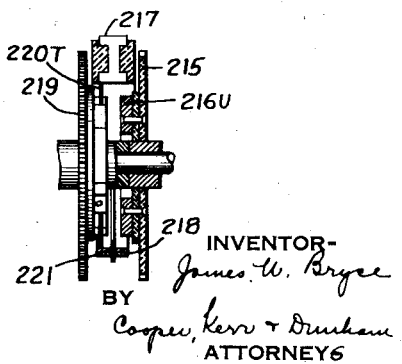

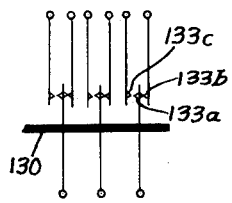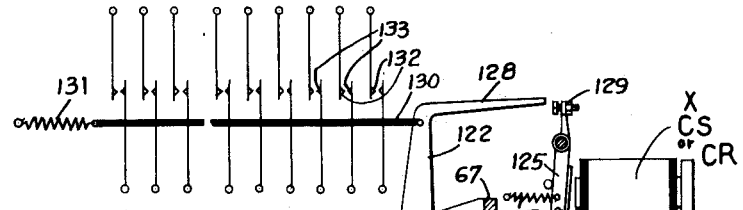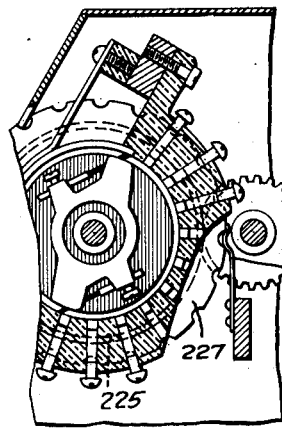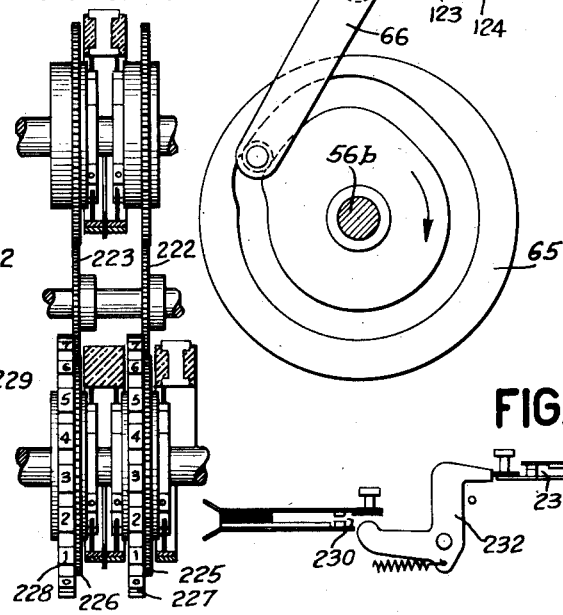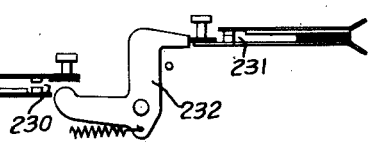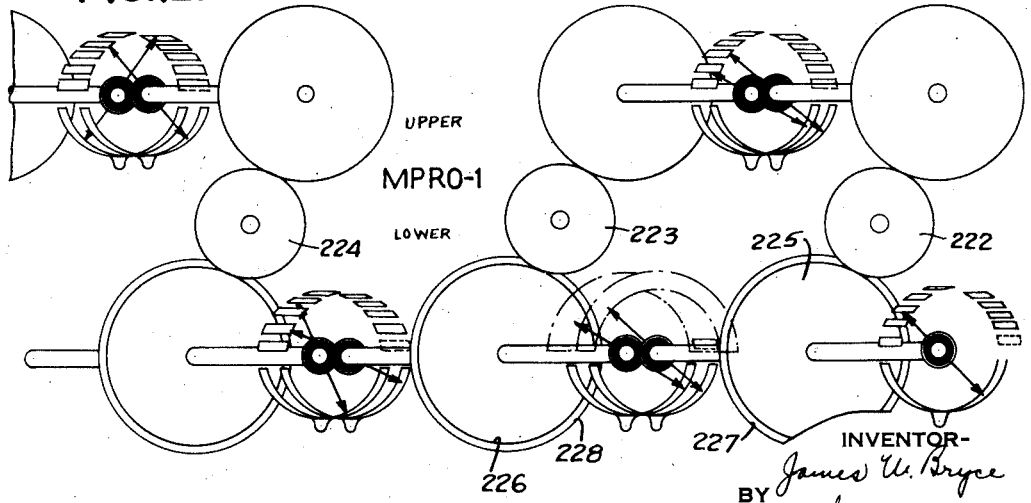

June 14, 1938.         J. W. BRYCE         2,120,228
ACCOUNTING MACHINE
Filed Feb. 1, 1933         16 Sheets-Sheet 7

INVENTOR-
James W. Bryce
BY
Cooper, Kerr & Dunham
ATTORNEYS

June 14, 1938.  J. W. BRYCE  2,120,228
ACCOUNTING MACHINE
Filed Feb. 1, 1933   16 Sheets-Sheet 8

INVENTOR-
James W. Bryce
BY
Cooper, Kerr & Dunham
ATTORNEYS

June 14, 1938.  J. W. BRYCE  2,120,228
ACCOUNTING MACHINE
Filed Feb. 1, 1933  16 Sheets-Sheet 9

INVENTOR-
James W. Bryce
BY
Cooper, Kerr & Dunham
ATTORNEYS

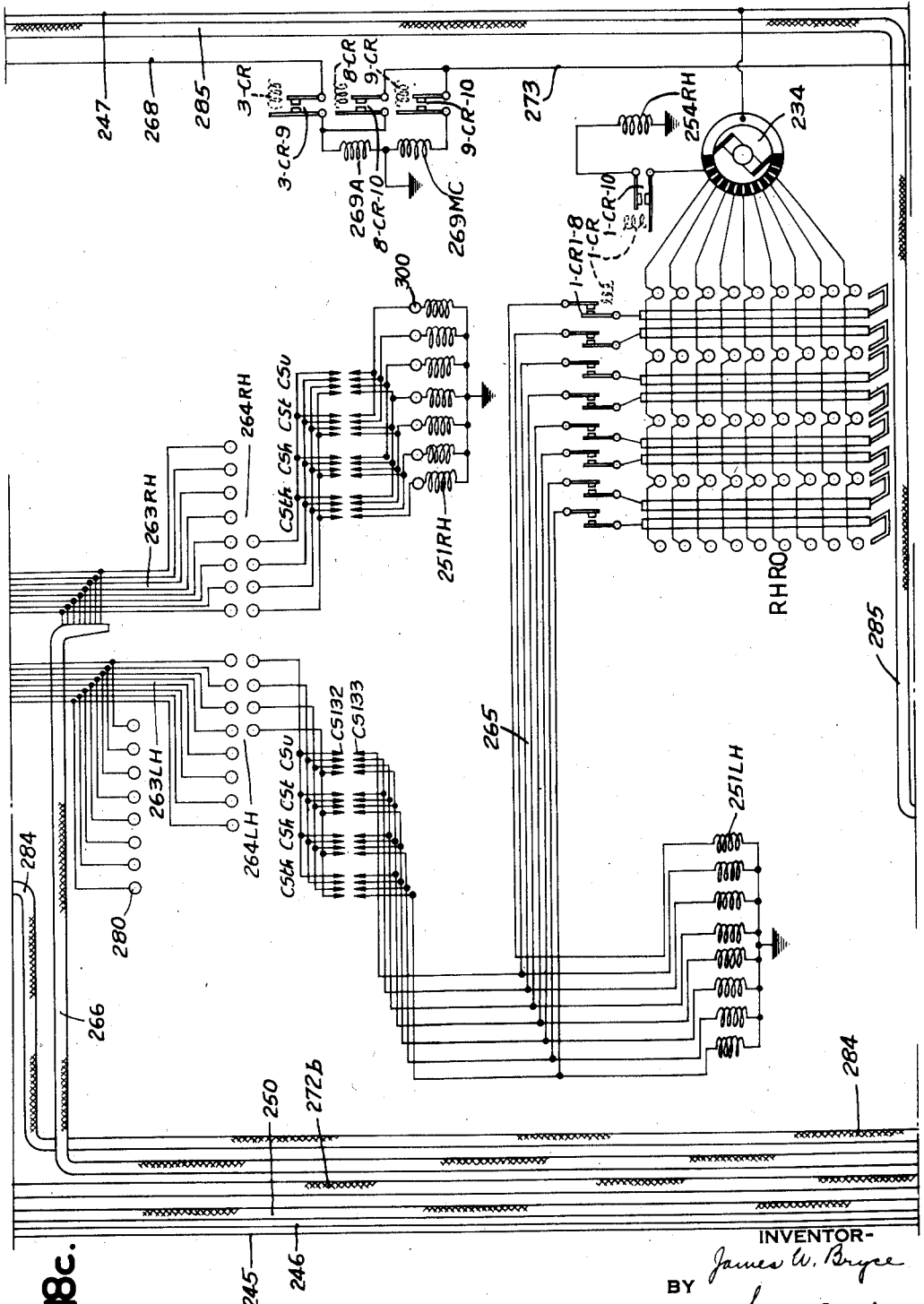

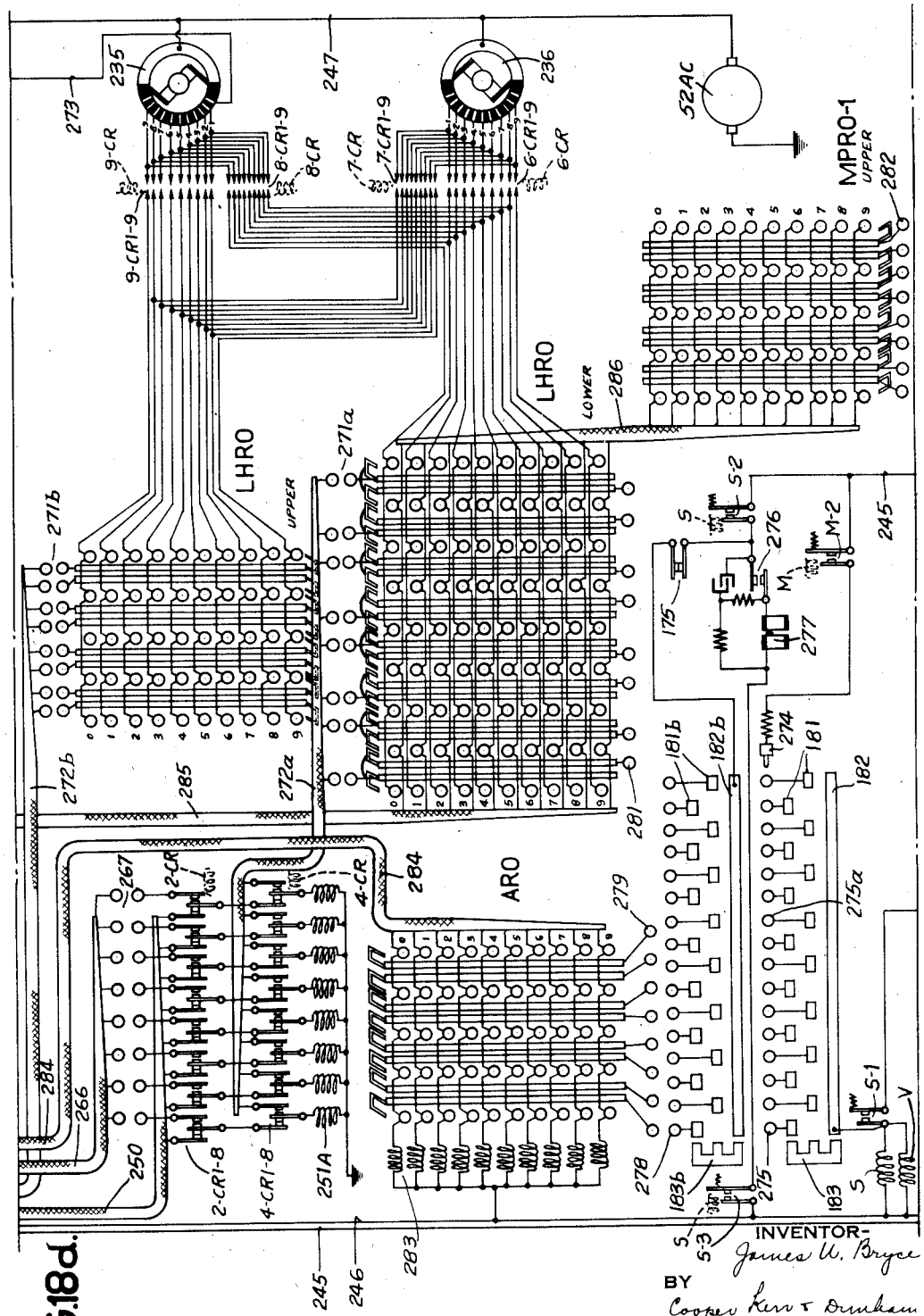

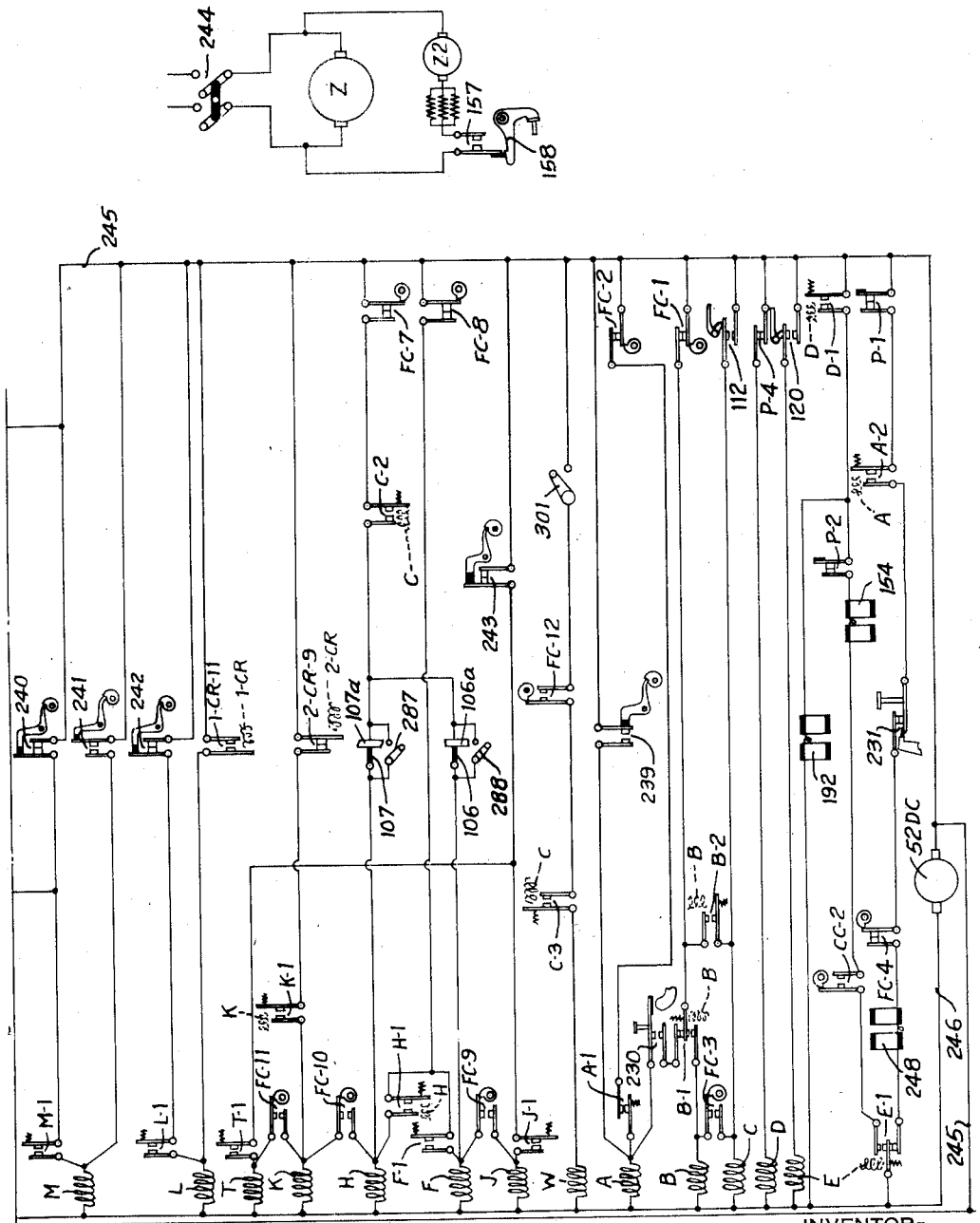

June 14, 1938.    J. W. BRYCE    2,120,228
ACCOUNTING MACHINE
Filed Feb. 1, 1933    16 Sheets-Sheet 13

June 14, 1938.  J. W. BRYCE  2,120,228
ACCOUNTING MACHINE
Filed Feb. 1, 1933  16 Sheets-Sheet 14

INVENTOR-
James W. Bryce
BY
Cooper, Kerr + Dunham
ATTORNEYS

June 14, 1938.　　　　　J. W. BRYCE　　　　　2,120,228
ACCOUNTING MACHINE
Filed Feb. 1, 1933　　　16 Sheets-Sheet 15

FIG. 20.

Figures 21, 22:
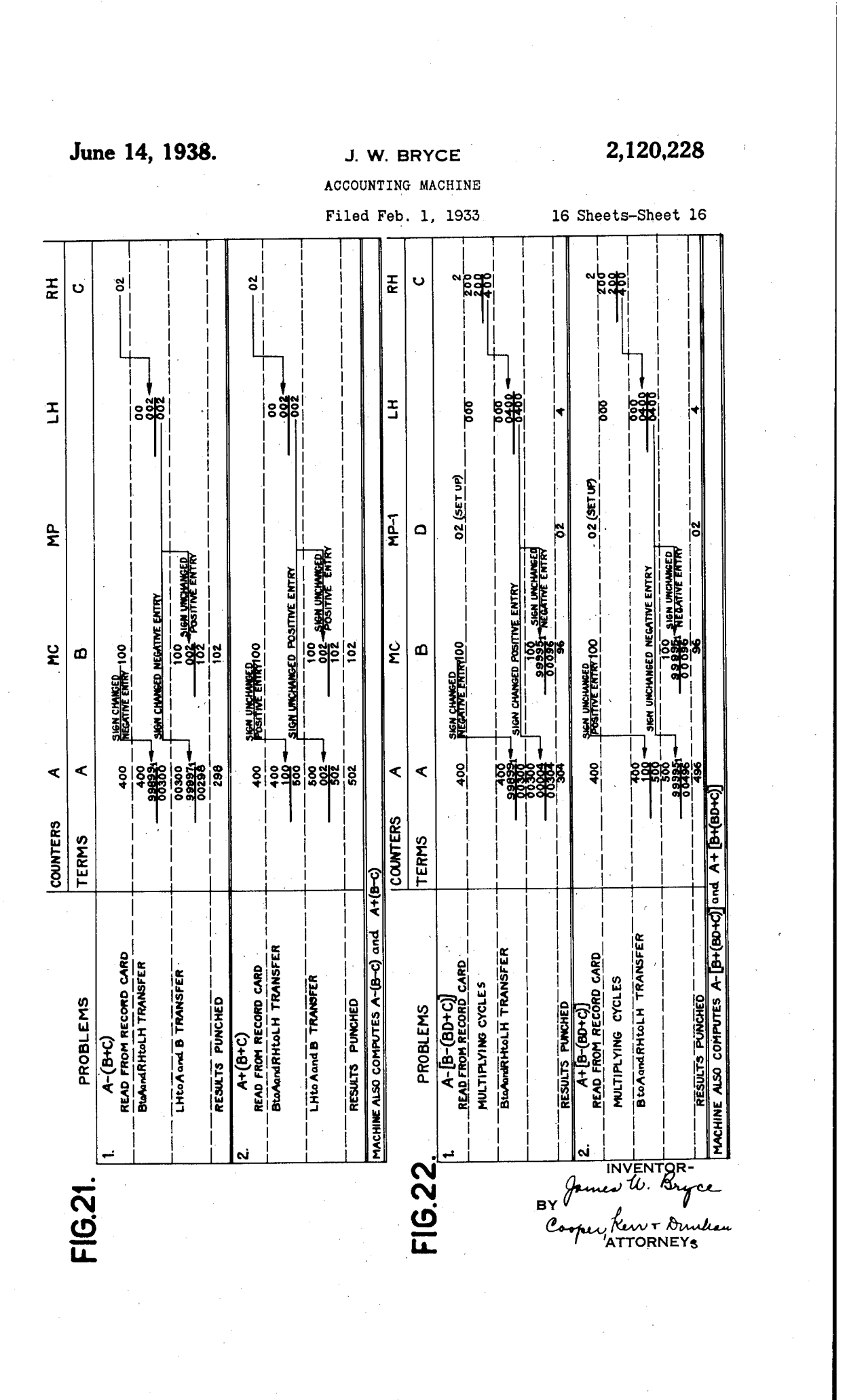

June 14, 1938.       J. W. BRYCE       2,120,228
ACCOUNTING MACHINE
Filed Feb. 1, 1933       16 Sheets-Sheet 16

INVENTOR-
James W. Bryce
BY
Cooper, Kerr & Dunham
ATTORNEYS

Patented June 14, 1938

2,120,228

UNITED STATES PATENT OFFICE 2,120,228

ACCOUNTING MACHINE

James W. Bryce, Bloomfield, N. J., assignor, by mesne assignments, to International Business Machines Corporation, New York, N. Y., a corporation of New York Application February 1, 1933, Serial No. 654,619

44 Claims. (Cl. 235—61.8)

This invention relates to improvements in accounting and calculating machines and more particularly relates to a machine adapted to perform a quite complex set of computations which involve the evaluating and merging of the terms of a polynomial expression and in which the rule of signs must be applied in the merging operations.

In certain cases the signs of merged terms must be reversed and in other cases the merging must be effected with unchanged signs of the terms. Some of the more complex calculations also involve multiplication of entered terms.

More particularly the machine is of the general class wherein certain data relating to a computation is taken from a record, with the alternate possibility of taking certain other data involved in the computation from set up mechanism in the machine and carrying out the requisite computation and recording intermediate and final results upon the record from which certain primary data was derived.

Before describing the further objects of the invention a brief explanation will be made of an illustrative use of the machine.

There are often commercial transactions made where there is a loan of a given amount for a given period of time with payments to be made on the loan at stated intervals. For instance, there might be a $400. loan to be paid back over a year period in four equal quarterly installments. In handling such loans the practice is to charge up to the borrower the interest for the entire period on the assumption that the payments will be made on their due dates. For example, with the $400. loan at four percent (4%) in quarterly payments the interest would be $8.00 and the borrower would get $392. in cash at the time of making the loan. If each payment by the borrower is made on the actual due date there is no adjustment of interest required. However, if the borrower pays back any installment payment on a date ahead of the due date he is credited with a computed amount of interest which is based on how far in advance of the due date he pays such installment. Similarly, if the borrower fails to pay on the due date but pays on a later date, he is debited with an extra interest charge. The crediting or debiting of additional interest in transactions of this sort is based on a so-called interest factor, which interest factor is computed according to the rate of interest and the number of days involved, either advanced or belated dates. For example, there would be one interest factor if the payment was made ten days ahead and a different interest factor if the payment was made nine days ahead and so on. Such transactions generally involve a computation of the general form which may be expressed as the following equation $$A-[B\pm(B\times C)]=R$$

wherein A equals the amount of the loan
B equals the amount of a given payment
C equals the interest factor which is set up with reference to the date when the payment was actually made
R equals the new balance or the amount still due on the loan after the payment.

If payment is made ahead of the due date, $B\times C$ is added to B, if belated, it is subtracted. On such transactions it is desired not only to obtain the final result R and to record such final result, but to also compute, obtain and record certain intermediate results. For example, the result of $B\times C$ should be computed and recorded since this represents the interest to be debited or credited to the account.

C should also be recorded if this interest factor is set up in the machine and not already on a card.

The result within the bracket, i. e. $B\pm(B\times C)$ should also be recorded to show the actual amount debited or credited to the account.

Other commercial transactions may involve computations of the general form $$A+[B\pm(B\times C)]$$

wherein the computed amount within the bracket would have to be added to instead of being subtracted from the original amount A. Accordingly, the present machine is arranged to handle computations of the general form $$A\pm[B\pm(B\times C)]=R$$

and record not alone the final result R but also to record the intermediate results obtained in the successive steps of the computation.

Computations of the general form described above are generally known in mathematics as "polynomial expressions". The complete polynomial expression consists of certain monomial terms and also includes a polynomial term; i. e. A, B and C are in themselves monomials. Likewise the product $B\times C$ is a monomial, but the expression in brackets $[B\pm(B\times C)]$ is a polynomial term. The complete expression $$A\pm(B\pm(B\times C)$$

is also a polynomial.

In evaluating and merging a polynomial term with another amount the sign preceding the bracketed polynomial term must be taken into account. If negative it affects and reverses the signs of the monomial terms within the bracket when the bracket is removed and when such terms are merged with another amount. If the sign before the polynomial term is positive there is no change involved in the signs of monomial terms within the bracket when such bracket is removed and when such monomial terms are merged with another amount or term. This will be clear from the following equations:

$$a-(b+c)=a-b-c$$
$$a+(b+c)=a+b+c$$
$$a-(b-c)=a-b+c$$
$$a+(b-c)=a+b-c$$

Likewise in evaluating the bracketed polynomial term by itself, the sign preceding the bracket is wholly disregarded and is of no significance because the amount within the bracket is a distinct problem of itself, that is if $b+c$ or $b-c$ is considered by itself and evaluated, no change of sign is involved because there is no merging with any other term.

In the illustrative equations $$A-[B-(B\times C)]=R$$

in evaluation for the final result a change of signs is involved thus $A-B+(B\times C)=R$, but in solving and evaluating for the intermediate result of the polynomial term within the brackets no change of sign is involved since the intermediate result by itself is simply $B-(B\times C)$.

Likewise in the equation $A+[B-(B\times C)]=R$, no change of signs is involved in evaluating for the complete result which is $A+B-(B\times C)$ and the intermediate result is the same as before, viz. $B-(B\times C)$.

Accordingly, the present invention has for its general object the provision of an accounting machine adapted to compute and completely evaluate a polynomial expression one of whose terms is in itself a polynomial and in such machine provision is made for automatically applying the rule of signs when required in the complete evaluation. Provision is also made for separately evaluating the polynomial term itself while retaining the signs of the monomials of such polynomial term in such separate evaluation.

Broadly, one object of the present invention resides in the provision of an accounting machine for evaluating polynomial expressions where there may or may not be requirements for change in sign, such as in equations of the general type $A\pm(B\pm C)$.

A further object of the present invention resides in the provision of an accounting or calculating machine adapted for computing and evaluating computations of the general form $$A\pm[B\pm(B\times C)].$$

A further object of the present invention resides in the provision of an accounting machine adapted for polynomial types of computations involving a polynomial term wherein provision is made for automatically effecting changes in signs when required and/or for suppressing changes in signs when the polynomial term alone is evaluated.

A further object of the present invention resides in the provision of an accounting machine which is pre-settable for controlling machine operations according to the signs relating to certain terms of a computation.

A further object of the present invention resides in the provision of a machine provided with automatic sign identifying means for automatically controlling the machine operations and the merging of terms in accordance with such identified signs.

A further general object of the present invention resides in the provision of a machine adapted to rapidly and automatically compute a series of computations each of which is of the general form $A\pm[B\pm(B\times C)]=R$.

A further object of the present invention resides in the provision of a machine in which not only will the final result R above set forth, be computed, but in which provision is made for separately computing intermediate results of the foregoing computation and wherein means is also provided for recording any, all or none of such desired intermediate results.

A further object of the present invention resides in the provision of a multiplying machine wherein the control of the machine for adding and subtracting in any computations involving multiplication is effected automatically under record card control or alternatively under manual control, or alternatively part under record card control and part under manual control.

A further object of the present invention resides in the provision of an improved interlocking arrangement between a multiplying section of the machine and a punching section to insure that punching will not commence until both the punching section and the multiplying section of the machine are in condition for the beginning of such punching operations.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figures 1 and 1a taken together, show a somewhat diagrammatic view of the various units of the machine and also show the driving mechanism for the various units;

Fig. 2 is a vertical sectional view taken through the card handling and reading section of the machine and this view shows also the extra sensing brushes;

Figs. 3 and 3a taken together, show a somewhat diagrammatic view of the punching section of the machine;

Fig. 4 is a sectional view of certain parts in the punching section of the machine;

Fig. 5 is another detail view of certain parts in the punch;

Fig. 6 is a somewhat diagrammatic view of the readout device for the MP counter, which readout device is of dual form;

Fig. 7 is a fragmentary sectional view showing the construction of this MPRO readout device;

Figs. 8 and 9 are respectively diagrammatic and sectional views of the multiplicand readout device (MCRO);

Figs. 10 and 11 are diagrammatic and sectional views of the readout device for the RH accumulator. A similar form of readout is used for the extra A accumulator and such readout device is identical in construction with the RHRO device except for the number of segment spots. The RHRO readout device has nine spots and the readout device for the extra counter, viz. the ARO readout device has ten spots;

Fig. 12 is a diagrammatic view of the double readout device which is used on the MP hand setup device. This readout device comprises an upper section which is similar to the RHRO readout and a lower section which is similar to the MPRO readout;

Fig. 13 is a part elevational and part sectional view of the hand setup multiplier device with associated double readout device and Fig. 14 is a fragmentary side elevational view of the hand setup element of this fixed multiplier device;

Fig. 15 is a side elevational view of one of the multi-contact electromagnetic and electro-mechanical relay devices which are used in the machine;

Fig. 15a shows a modified contact arrangement for the multi-contact relay and

Figure 17:
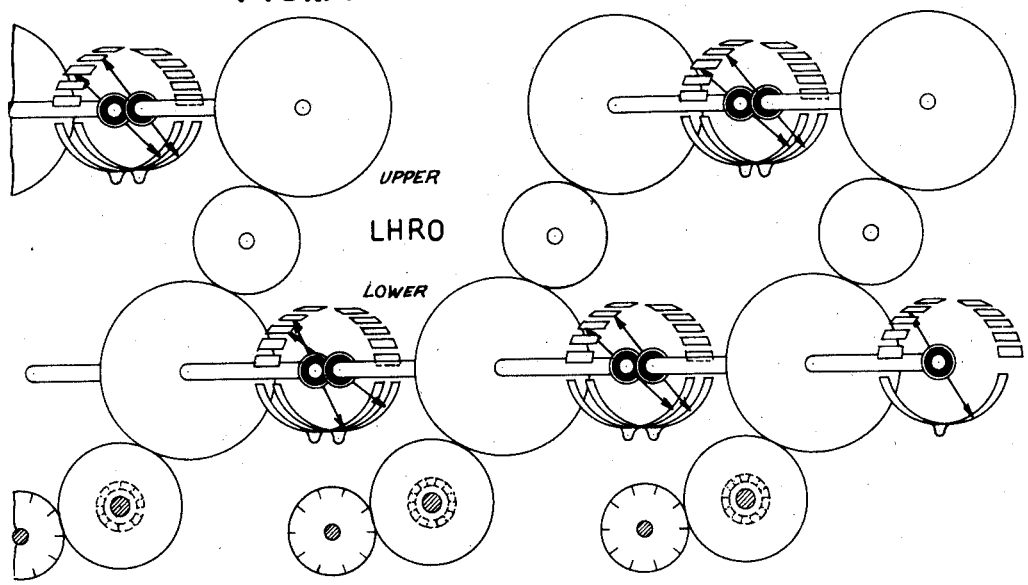
Figure 17A:
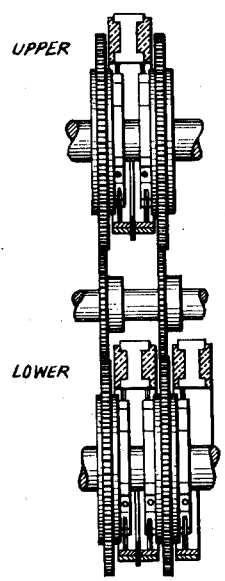
Figure 18A:
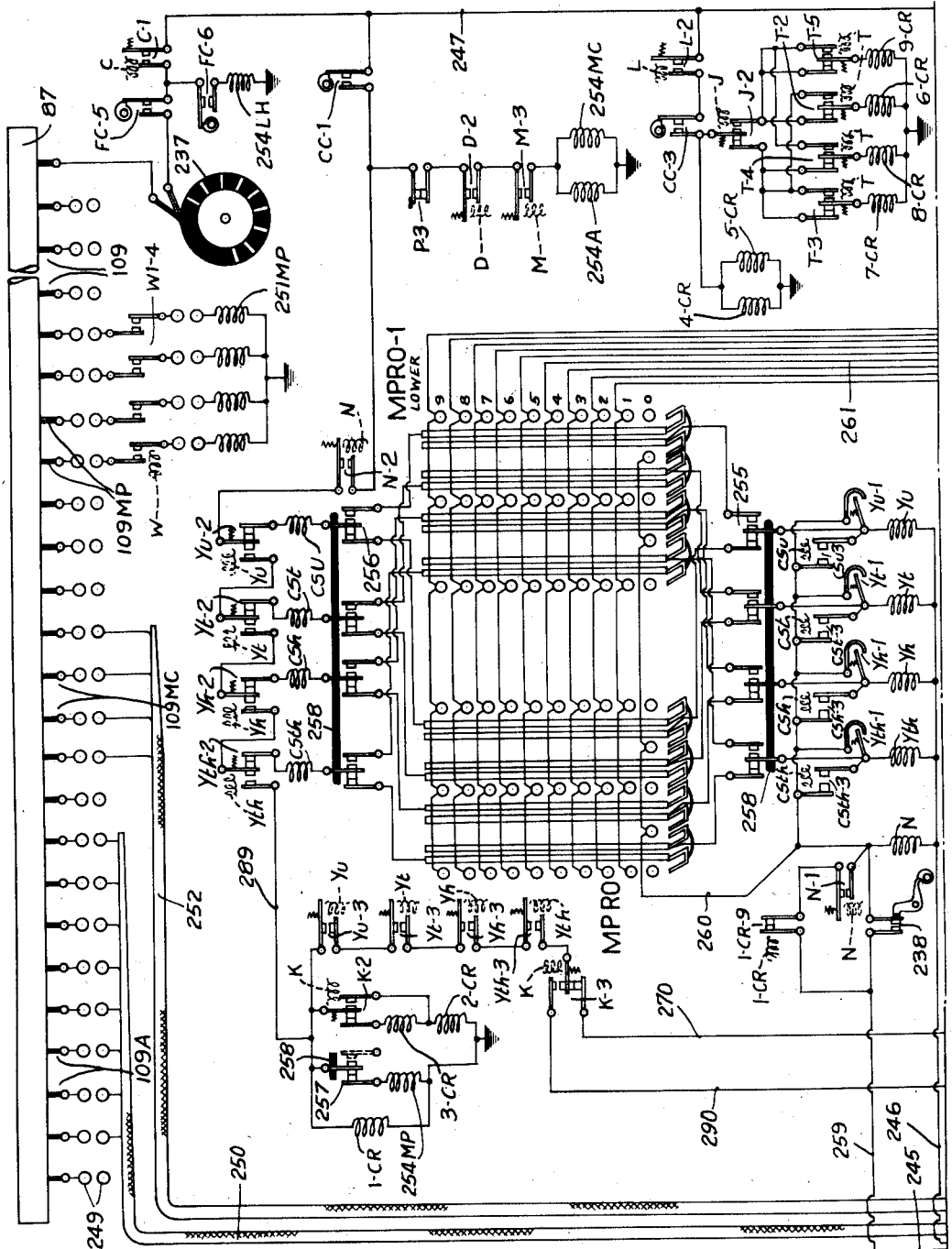
Figure 18B:
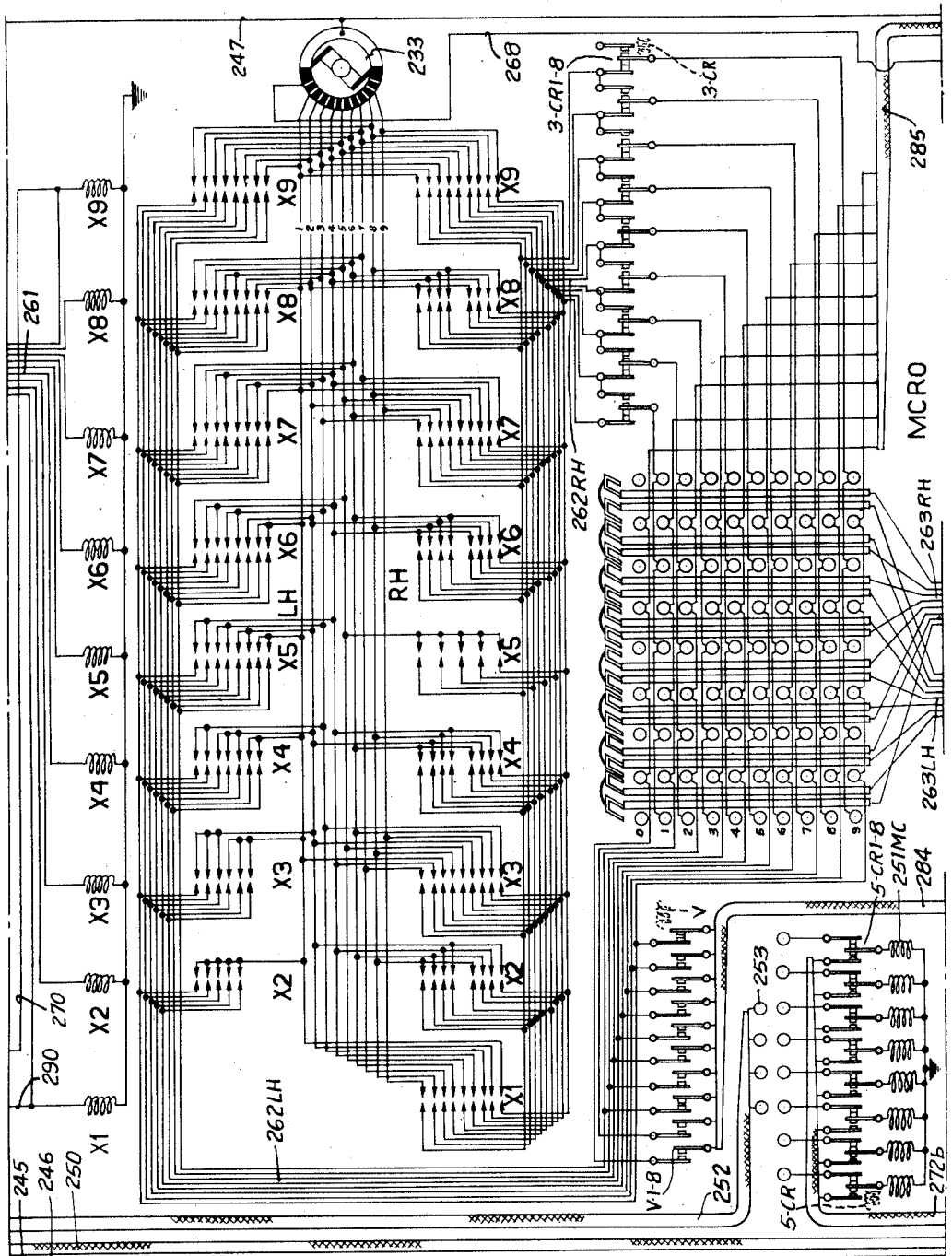
Figure 19:
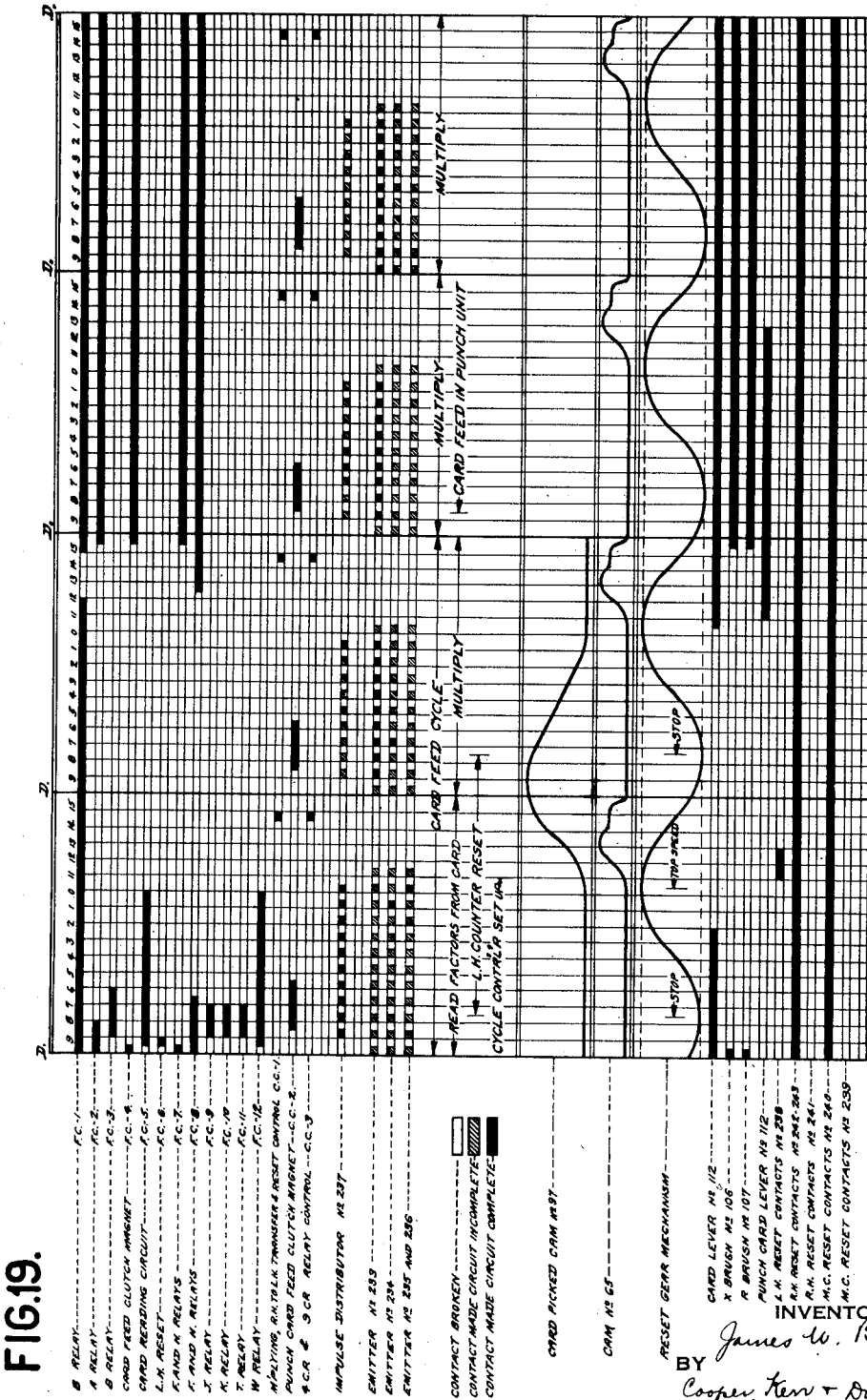
Figure 19A:
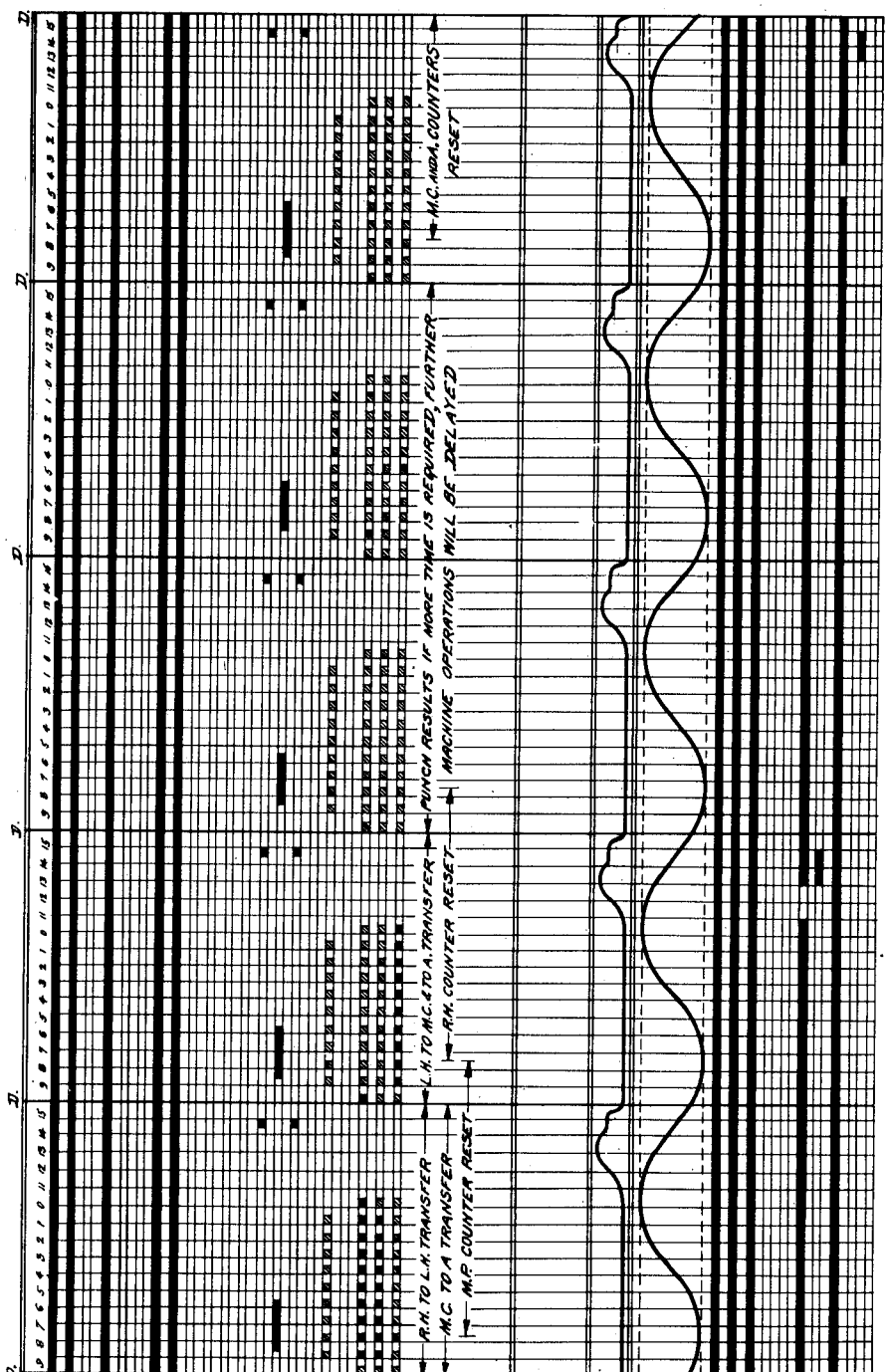

Fig. 16 is a detail view showing certain latching mechanisms which are used on the stop and start keys of the machine;

Figs. 17 and 17a respectively are diagrammatic and sectional views of the LH readout which is of dual form;

Figs. 18a, 18b, 18c, 18d, and 18e, taken together and arranged vertically in the order named, show the complete circuit diagram of the machine; and Figs. 19 and 19a taken together, show the timing diagram of the machine; and Figs. 20, 21 and 22 show illustrative typical computations which the machine is adapted to perform.

A general description will first be given of the various units and their location in the machine. The machine embodies a card feed and card handling section which is shown on Fig. 1a and also in cross-section on Fig. 2. This part of the machine is arranged to feed cards and derive readings therefrom and afterwards pass each card into the punching section of the machine. The punch is of the successive column punching type. A small portion of this punching mechanism only is shown in Fig. 1a and the rest of the mechanism is shown more completely in Figs. 3 and 3a.

The accumulators and/or receiving devices of the machine are as follows. In the upper part of the machine in Fig. 1a there is shown the RH accumulator. The LH accumulator and an extra A accumulator are also in the upper part of the machine (see Fig. 1). These accumulators are respectively designated RH, LH and A. In the lower part of the machine there are two accumulators which are used as multiplier and multiplicand entry receiving devices and which are respectively designated MP and MC on Fig. 1. Also associated with the MP entry device is the hand setup multiplier device. This is designated MP—1 on Fig. 1.

The machine also includes a multiplying relay unit which is in the lower part of the machine (Fig. 1a) and generally designated MPR. Also in the lower part of the machine there is another multi-contact relay unit for column shifting and control purposes which is generally designated CS and CR (see Fig. 1a).

The machine also includes a number of emitter mechanisms, cam contact devices, impulse distributor, etc.

*Machine drive*

The machine is adapted to be driven by a constantly running motor Z (Fig. 1a) which motor, through a belt and pulley and ratchet drive, drives a shaft 51, which in turn drives an A. C.—D. C. generator 52.

Shaft 51, through worm gearing drive 53 drives a vertical shaft 54 for driving the units in the upper and lower sections of the machine. At its upper end shaft 54, through worm gears 55 drives the main drive shaft 56. The various accumulators are driven from this shaft in the customary manner. The reset drive for the upper accumulator units is provided as follows. Shaft 56 carries a spur gear 57, driving a gear 58 with a four to one drive ratio. Gear 58 has extending from it four Geneva pins 59 cooperating with the other or cross element of the Geneva, designated 60. Secured to 60 is an internal gear 61 meshed with the spur gear 62 mounted on the end of the reset shaft 63. The reset shaft 63a for the RH accumulator is driven from the cross element 60 of the Geneva, through an internal gear 61a and a pinion 62a. The accumulators are reset from this reset shaft in the customary manner by electromagnetically controlled one revolution clutches.

The drive for the units in the lower part of the machine is substantially the same as previously described, i. e. shaft 54, through worm gearing 55b, drives the lower drive shaft 56b, which shaft also actuates parts in the MPR, CS and CR units. A similar Geneva drive 57b, 58b, 59b, 60b, 61b, and 62b is adapted to drive the lower reset shaft 63b. The accumulators in the lower section of the machine are reset from this reset shaft in the usual manner by means of electromagnetic one revolution clutches.

*Card feed and card handling unit drive*

Referring to Figs. 1a and 2, the customary card feed drive is provided which may be briefly described as follows. Shaft 56 through gearing 68, 69, 70, 71 and 72 drives a gear 73, revolubly mounted on shaft 75. Fixed to gear 73 is the element 76 of the card feed one revolution clutch, the complemental part of which comprises a pawl 77, carried by an arm 78 fixed to shaft 75. Gear 73 through a gear 79 fixed to gear 80 drives a train of gears 81, which in turn drive the card feed rolls 82. Also in train with gear 79 is a gear 83 for driving the drag roll shaft 84 carrying drag rolls 85. The usual card transfer and contact cylinder 87 is provided driven in the following manner. Fixed on shaft 75 is a gear 88, which, through gearing 88b, 88d, drives a gear 89 which is fixed to the sleeve 89a revolubly mounted on shaft 75 and fixed to the card transfer and contact roll 87. The intermittently actuated FC group of cam contact devices are driven in the following manner. A driving train is provided from gear 86 which gear is fixed to shaft 75 and which train includes gearing 90, 91 and 92, the latter gearing being fixed to the cam contact shaft 93. Fixed to the shaft of gear 90 are spring pressed card feed rolls 94. Other spring pressed card feed rolls 95 are driven by the gear 86. The card picker is driven in the customary manner by a box cam 97 fixed on shaft 75 cooperating with the follower 98 which rocks a rock shaft 102 carrying a gear sector 103 which is in engagement with the picker block 104. Upon engagement of the one revolution card feed clutch the picker is called into action to withdraw a single card from the magazine 105 (Fig. 2) and advance the card into the bite of rolls 82, which rolls in turn forward the card to the card transfer and contact roll 81. Intermediate rolls 82 and the transfer cylinder 87 there are provided two extra or advance sensing brushes at two separate sensing stations disposed one index point apart. One of these extra brushes is shown at 106 and its contact block is shown at 106a. The other extra or advance sensing brush is shown at 107 and such 107 brush cooperates with the combined contact and card guide plate 107a. It will be understood that 106a and 107a are insulated from each other and also that the brushes 106 and 107 are disposed one index point apart and are adapted to cooperate with the 11th and 12th index hole positions on the cards. A curved card guide is provided around the transfer and contact roll and the advancing card is carried around by the forward rotation of the roll and by the rotation of rolls 94 to traverse the card past the main sensing brushes designated 109 in Fig. 2. Also in cooperation with the card is a pivoted card lever 111 operating card lever contacts 112. After the card has been sensed by the main sensing brushes it is advanced by rolls 95 and roll 87 between guiding members 114 and 115, and while between these members it is advanced by the drag rolls 85. The drag rolls 85 deliver the card under the guiding member 117 and ultimately the card is flipped down into the tray of the punching section of the machine. The location of the tray is indicated at 118 in Fig. 2 and the position of a card in this tray is indicated in Fig. 1a. A card lever 119 (Fig. 2) is provided adjacent the tray for closing card lever contacts 120 when a card is in the tray of the punching section of the machine.

With the traverse of a card past the advance sensing brushes, the control of the machine will be effected variably according to the presence or absence of a hole or holes at the 11th and/or 12th index point positions. If the card contains no perforations at these positions the machine will perform the merging and evaluating operation of $A-[B+(B \times C)]$ with a change of sign of the terms within the bracket when evaluating the complete expression and will effect merging with unchanged signs when evaluating the expression within the bracket. On the other hand if the 106 brush encounters a hole at the 11th index point position and the 107 brush encounters no hole at the 12th index point position the evaluation will be that of $A-[B-(B \times C)]$. Here again there is a change of sign in evaluating the complete expression. On the other hand if the 107 brush encounters a hole at the 12th index point position and the 106 brush encounters no hole at the 11th index point position, the evaluation will be that of $A+[B+(B \times C)]$. In evaluating this expression no change or sign is involved or required for either the merging for the complete expression or for the polynomial term of the expression. Likewise if both brushes 106 and 107 encounter holes at both the 11th and 12th index point positions the computation and evaluation will be of the general form $A+[B-(B \times C)]$. Here again no change of sign is involved in evaluating the complete expression or the polynomial term of the expression. As will later be explained, settable manual switches can be used in lieu of the brush controls and in certain instances a switch can be used in conjunction with a brush control.

With the traverse of the card past the main sensing brush 109, the amount of the multiplier and the amount of the multiplicand will be read from the card and entered into the MP and MC receiving devices of the machine. Under certain types of computations, no multiplier amount is read from the card in which case the amount of the multiplier can be derived from the fixed MP—1 setup device. While the multiplicand amount and possibly the multiplier amount is being read from the card the amount of the factor or term A of the computation will be read into the A accumulator. The MP and MC receiving devices, LH, RH and A accumulators are of the usual type as customarily used in tabulating machines and are provided with the usual electro-magnetically operated clutches.

*Multi-contact relays*

The machine includes a number of electromagnetically controlled and tripped multi-contact relays. These are used in the MPR, CS and CR sections of the machine. The mechanical drive for these relays is provided for in the following manner. The lower drive shaft 56b drives operating cams 65 (see Figs. 1a and 15). Cooperating with each cam is a follower arm 66 which is adapted to rock a bail 67. Loosely mounted on shaft 121 are a number of U-shaped members 122, each provided with an arm portion 123 extending under the bail 67 and cooperating with the latch member 124 which is pivotally mounted on the armature member 125 and spring urged in an anti-clockwise direction by a spring 126. The armature is normally rocked clockwise by a spring 127. Each member 122 has an armature knockoff arm 128 adapted to cooperate with a knockoff extension 129 of the armature. Also fixed to each member 122 is an insulated contact operating part 130 which is normally drawn to the left by a spring 131. The contacts 132 and 133 are provided, the latter 133 being fixed to the member 130. Upon the full movement of 130 to the left the contacts 132 and 133 will close.

In the operation of this multi-contact relay, the bail 67 is first displaced in the position shown. An arm 123 is slightly depressed to relieve the strain from the latch point where 123 cooperates with 124. A relay magnet X, CS or CR may then be energized, swinging the armature 125 to the right causing the latch 124 to clear 123 and snap down under spring action by spring 126 to a position at the end of member 123. Thereafter upon further motion of the cam 65 in the direction indicated by the arrow, the bail 67 is elevated allowing an anti-clockwise motion of member 122 and permitting the contacts to close under spring action. Subsequently further movement of the cam 65 causes the bail 67 to be again depressed to reopen the contacts and to thrust 128 to the right to a supplemental extent to knock off any previously attracted armature. At this time there is a relatching of the latch 124 with member 123. If a given armature is not attracted by the energization of the relay coil, latch 124 will not be tripped and such latch will prevent the anti-clockwise motion of the members 122 and the closing of the contacts upon the elevation of bail 67.

In the subsequent description of the wiring diagram, certain of the contacts which have been generally designated 132 and 133 in the foregoing description of the relay, will be given designating reference numerals relating to their associated relay control magnets. Thus 1—CR—1 to 11 will designate the eleven contacts controlled by the relay magnet 1—CR. In Fig. 15a there is shown a slightly different contact arrangement. In this figure contacts 133a which are generally connected with the member 130, are arranged to contact either with contacts 133b or 133c. Upon the full movement of 130 to the left, 133a will break with 133b and make with 133c.

Punching mechanism

The punching mechanism is of the customary successive column acting repetition punching type as used in machines of this class. It is generally of the form shown in Lee and Phillips United States Patent No. 1,772,186 and British Patent No. 362,529, correponding to the United States application of Lee and Daly, Serial No. 391,874, and in United States Patent to Bryce, No. 1,866,995.

The punching mechanism includes two card feed racks 141 and 142 (see Figs. 3 and 3a). 142 carries an arm provided with pusher fingers 143. The drive is by a separate motor Z—2 which through the driving train shown, drives a shaft 144 which has a ratchet shaped clutch element 145 fixed on one end of it. Alongside of 145 is a gear 146 which meshes with the lower teeth of 141. Secured to 146 is a disk 147. Pivoted on 147 is a member 148 provided with a ratchet shaped clutch tooth 149. Alongside of 148 is another member 148b which lacks the clutch tooth. On 148 is a pin 148c overlying an arcuate surface of 148b. The free end of 148b is connected to a toggle member 150 by a link 151. 150 is pivoted on 147 at 152. The opposite end of 150, remote from its pivot 152 is connected to a spring element 153, which spring tends to hold the clutch tooth 149 out of engagement with the clutch teeth of element 145 and allows it to engage when 150 is shifted. For the purpose of effecting a clutching action a punch feed clutch magnet 154 is provided. This magnet when energized attracts its armature and causes an arm 155 to engage a pin 156 (see Fig. 3a) in which figure the extension of this arm 155 is shown in dotted lines for clarity of illustration of the other parts, depressing 148b and allowing 148 to descend so that that the tooth 149 engages with the ratchet 145. Upon such engagement, the gear 146 will be driven in counterclockwise direction substantially a single revolution, shifting rack 141 to the left. This action will, through the card pusher shown in Fig. 3a, move the card from the initial position to an intermediate position. Also when magnet 154 is energized, an arm 155a on the armature will close contacts 157. Such contacts are latched closed by a latch 158 (see Fig. 4). The latch 158 is tripped to allow the contacts to reopen by a knockoff 159 carried on the back of gear 146 (see Fig. 3a). At the termination of the counter- clockwise movement of gear 146 the tails 160 of parts 148 and 148b will strike a projection 161 on a fixed plate to effect the disengagement of the tooth 149 from the ratchet 145.

It will be understood that the tails 160 do not actually pass the fixed projection 161, but are merely intercepted by such projection and then retreat away from the projection in a clockwise direction. This action just described also restores the toggle parts to normal position.

The above driving action has wound up a spring in spring barrel 162. Upon disengagement of the one revolution clutch tooth 149, in the manner above explained, rack 141 returns to the right under the influence of the spring in the barrel 162. During such movement of rack 141 to the right the tails 160 retreat in a clockwise direction away from the intercepting member 161.

The driving train to the second card carriage rack 142 is as follows. Rack 141 has its upper teeth intermeshed with gear 163 which has secured to it a member 164 (see also Fig. 5) having a single notch or tooth disposed in the plane of a pawl 165 which is pivoted on part 166 fixed to the shaft 167. Shaft 167 on its opposite end carries a gear 168 which meshes with the card carriage rack 142. Suitable mechanism shown in Fig. 5 controls the co-action of pawl 165 with member 164 so that with the rack 141 in extreme right hand position pawl 165 will be disengaged from the clutch element 164. Such disengagement is effected by the rocking of 169 in a clockwise direction by the co-action of the pin 170 with a block 171 carried on rack 141. Upon initial movement of 141 to the left the block 171 will clear the pivoted camming element 169 allowing a slight counterclockwise motion of it so that 165 under spring action may rock and engage the tooth of member 164. Thereafter drive will come from 141 through gear 163, through 164, to pawl 165, to 166, to shaft 167 so that a clockwise rotational movement will be imparted to 167. This action will, through gear 168, traverse rack 142 to the right. The card carriage rack 142 will thus be shifted to extreme right hand position permitting the card pushers 143 (Fig. 3) to first ride over the surface of the card and ultimately engage back of the trailing edge of the card at the intermediate position. Rack 142 has associated with it a spring drive comprising the usual spring barrel 172. This spring is wound up by the traverse of 142 to the right and is adapted to cause a movement of 142 to the left under spring action. The rack 142 also has associated with it an escapement mechanism 173 having a dog 174. This escapement is more fully described in Schaaff United States Patent No. 1,426,223 and in Lee and Phillips Patent No. 1,772,186. The usual controlling contacts 175 customarily used in machines of this class are also provided cooperating with the escapement parts.

Removably secured to the card carriage rack 142 is a skip bar 176 provided with a notched portion 177 which permits skip lifter lever 178 to descend when in the notch or to remain elevated when riding on the high part of the skip bar. When the skip lifter lever descends into the notch it allows the dog 174 of the escapement mechanism to cooperate with the ratchet teeth of rack 142. With skip lifter lever 178 riding on the top of the skip bar 176 the escapement will be disabled so that the card carriage rack 142 can traverse without stopping at each card column until the notch 177 is reached. Thereafter there is an intermittent motion of the card carriage to the left under spring action and under escapement control. When the skip lifter lever again rides out of the notch the card carriage rack 142 takes its full excursion of movement to the left. The location of the beginning of the notch in the skip lifter lever bar determines the position for the beginning of result or other punching. When the escapement dog is lifted up the contacts 175 are open as is customary with machines of this class. It may be explained that various forms of skip bars can be placed in the machine depending upon the class of work which is to be performed. If only one result is to be punched, a notch of a certain length and certain location will be provided. If several results were to be punched the notch would be correspondingly extended or additional notches provided.

The punching mechanism proper need not be fully described as it is fully set forth in the Lee and Phillips patent above referred to and in British Patent No. 362,529. In brief it comprises a set of punches 179, which punches are adapted to be depressed to perforate the card through interposers not shown, but which are under the control of punch selector magnets.

Referring to Fig. 3, there is shown disposed alongside of the card carriage rack 142 and fixed to the frame of the machine, two blocks or strips of insulating material 180 and 180b. Disposed in these blocks are a number of spots 181 and 181b of conducting material and alongside of these sets of spots are common strips of conducting material 182 and 182b. Suitable bridging pieces or multiple brush assemblies 183 and 183b are provided carried by the card carriage rack 142 and as this card carriage rack moves, the bridging brushes 183 and 183b are displaced and establish circuit connections from the common strip 182 to one of the spots 181 and from the common strip 182b to one of the spots 181b depending upon the columnar position of the card carriage rack 142. The spots 181 and 181b are preferably placed in two rows and are interstaggered as shown. This structure will be hereinafter termed "a double reading strip".

Card ejector

Referring to Fig. 3, after the card has reached the R—1 position and has been traversed past the punches and has been punched, it ultimately reaches a position at the extreme left hand end of the punching section of the machine, from which point it may be discharged into the discharge hopper. The card eject mechanism is shown in Fig. 3 with the parts in the eject position. Upon the first card feeding operation through the punching section of the machine, rack 141 will have moved towards its extreme left position. After reaching the dotted line position shown in Fig. 3, 141 moves further to the left and thrusts a rack 184 to the left compressing coil spring 185. Bearing against a shoulder on rack 184 is a contact operating bar 186. When 184 is thrust to the left contacts P—2 which were previously closed, will open under their own spring action. The thrusting of 184 to the left will also allow a member 184a to rock and allow contacts P—3, which were previously closed, to open. The displacement of rack 184 to the extreme left position will, through intermediate gears 187, rock a shaft 188 in a clockwise direction to bring an ejector clip assemblage 189 away from the position shown in Fig. 3 to a position in which the ejector clip can receive a card which has been advanced through the machine. With the ejector clip assemblage 189 disposed in such card receiving position the assemblage will be latched in such position by a latch 191, which latch is fully described in British Patent No. 362,529 (see latch 218 of that patent in Fig. 16). The ejector clip latch is adapted to be released by an ejector clip magnet 192. Upon energization of the eject magnet 192 latch 191 is released so that the ejector clip assemblage which has then grasped a card, swings from the card receiving position to the position shown in Fig. 3, in which position the jaws of the ejector are opened up so that the card can be discharged therefrom.

Contact devices in punching section of the machine

The contact devices P—2 and P—3 have been previously described. In the punching section there are other contact devices as follows. Contact devices P—1 (Fig. 3a) are contacts which are closed when rack 141 is in extreme right hand position and ready to receive a card from the card handling and sensing section of the machine. Contact devices P—4 (Fig. 3) are also provided, such contacts are operated as follows. An extension 195 on rack 142 is adapted, when rack 142 has passed beyond the last card column position, to allow contacts P—4, which were previously open, to close. Such contacts P—4 are normally open when rack 142 is in any of the positions to the right of the position beyond the last column position.

Readout devices

Referring to Figs. 6 and 7 which show the MP readout device (MPRO), 200 is a clutch gear pertaining to the units order of the MP receiving device. Gear 201 is driven from this clutch gear and this gear in turn drives a brush assembly designated 202U, which traverses the segments 203 and current supply segment 204. There is also another brush 205U driven by gear 201 which traverses a segment generally designated 206, which segment is provided with a single contact spot at the zero position. Brush 205U also traverses a current supply segment 207. There is also provided a similar brush 205T which is positioned from the tens order clutch wheel 208 and which also traverses the segment 206 which contains only the single contact spot at the zero position. 205T also traverses current supply segment 209. Similarly there is a brush 202T driven with brush 205T which brush traverses segment spots 210 and which receives current from the common supply segment 211. This arrangement of brushes and segments is repeated for the higher orders in the MPRO readout device, i. e. each alternate segment is like 206 with only a single spot in the zero position. Alternating with these segments are other segments similar to 203 and 210, with a multiplicity of spots on each segment.

The wiring of the MPRO readout will be shown in connection with the description of the circuit diagram.

MCRO readout

The drive for the brush assemblies of the multiplicand readout device is the same as previously described for the MP readout. The segment arrangement, however, is different. In lieu of the segments 203, 206 and 210, segments 212, 213 and 214 are provided, each with a multiplicity of spots as shown, i. e. there are ten spots on each segment.

RHRO and ARO readouts

With the RHRO and ARO readouts a different driving arrangement is provided. The units order train 215 drives a brush assemblage 216U which traverses segments 217 and which receives current from a conducting segment 218. The tens order train 219 drives a brush assemblage 220T which also traverses the segments 217 and which receives current from a conducting segment 221. This arrangement is repeated for the relatively higher orders of the readout. On the RHRO readout the segments 217 are provided with nine conducting spots and on the ARO readout, ten of such conducting spots are provided.

MPRO—1 readout

Referring now to Fig. 12 the hand setup device for the multiplier, such hand setup multiplier device comprises a lower readout section which so far as its arrangement of segments and brushes are concerned, is identical with the MPRO readout previously described. Intermediate gearing 222, 223 and 224 drives the upper section of this readout which is identical with the ARO readout previously described, that is the segments are provided with ten spots. As shown in Figs. 13 and 14, each of the lower gears 225 and 226 of the readout which drive the lower brush assemblages, has alongside of it a knurled wheel designated 227 and 228. Such knurled wheel may be provided with suitable designating indicia on its periphery corresponding to match with the index line on the case of the readout and show in which position the brushes of both the upper and lower sections are set. For impositively retaining the brush assemblies in position a spring detent 229 may be provided cooperating with the alining notches in the periphery of the hand setup members 227 or 228.

LHRO readout

The readout device for the LH accumulator is of dual form. Such readout comprises an upper section designated by the legend "Upper" on Fig. 17 and a lower section designated by the legend "Lower". The two sections are geared together by intermediate gearing. The lower section so far as the segment arrangements and drive therefor from the clutch gears, is the same as the MCRO readout previously described. The upper section which is driven by intermediate gearing from the lower section and so far as its segment arrangement is concerned, is like the ARO readout, that is the segments have ten spots each.

Inter-control between start and stop keys

Referring to Fig. 16, 230 are the start key contacts and 231 are the stop key contacts. Intermediate these contacts there is provided a spring urged latch member 232. The arrangement is such that upon the depression of the stop key latch member 232 will keep the stop key contacts 231 open and the start key contacts 230 will also be kept open. Thereafter, upon the depression of the start key to close its contacts 230 the latch member 232 will be rocked anti-clockwise to release the key contacts 231 and permit their reclosure. This interlocking control is provided for simplifying the control circuits in the machine as will be more fully set forth in connection with the description of the circuit diagram.

Emitters and cam contacts

The main drive shaft 56 is adapted to drive the cams of certain CC cam contact devices. These cams are correspondingly numbered on Fig. 1 as CC—1 to 3 inclusive. Also driven from shaft 56 are four emitters 233, 234, 235 and 236 which are of conventional construction. An impulse distributor 237 is also provided which is driven in unison with cams CC—1 to 3.

Reset control contacts

The reset gear of the LH accumulator is shown provided with a cam adapted on the reset of this accumulator to cause closure of contacts 238. On the MC accumulator, cam means are provided adapted upon the reset of the MC accumulator to cause closure of contacts 239 and opening of contacts 240. Referring now to Fig. 1a, on the RH accumulator, cam means are provided adapted upon the reset of this accumulator to cause contacts 241 to close and to cause contacts 242 and 243 to open.

Circuit diagram

In the following detailed description of the circuit diagram, the operation will first be explained on a type of operation wherein factors A, B and C of the previously mentioned equation are all disposed upon the record cards themselves and wherein the machine is intended to carry out a computing operation of the general form $A-[B+(B \times C)]=R$.

In carrying out this computation the intermediate results which are to be obtained are an intermediate result $R-1=B+(B \times C)$ and an intermediate result $R-2=(B \times C)$. It will be noted that on account of the minus sign preceding the bracketed portion of the equation the final result expressed with the brackets removed, is as follows:

$$A-B-(B \times C)=R$$

This form of computation will be more readily understood if an illustrative example is considered at this point. Assume that the amount of a loan is $400. and that this equals amount A. Assume that a quarterly payment is $100. which equals amount B. Assume that the interest factor is .02. It is now desired to compute by the operation of the machine the final result A which is the amount of the balance due on the loan after payment has been made with due adjustment for the interest factor. It is also desired to compute and record the amount with which the account is to be credited. This amount is the intermediate result $R-1$ or $B+(B \times C)$ or applying the above assumed values; $100+(100 \times .02)=102$, which equals $R1$. It is also desired to record the intermediate result $B \times C$ which is the amount of interest credited, or $2.00. The final result R now is the following amount $400-100-2=R$ or 298 which is the balance due on the loan after the credit has been applied and the interest factor taken into consideration. It will be noted that in the above computation so far as the part of the equation within the brackets is concerned, $B \times C$, is to be added to B and such addition must be made in order to get the intermediate result $R1$, but when the final result of the computation is to be obtained the sign before $B \times C$ changes. $B \times C$ becomes a negative quantity and is subtracted along with the amount B from A.

The above illustrative case is one based on a payment made earlier than the due date.

If in contradistinction the payment is made late, in this case, the accrued interest must be debited instead of credited. The amount within the brackets then becomes $B-B \times C$ or 100 less $2.00 equals $98. equals R1 and when the final computation is to be computed the sign before the $B \times C$ portion of the equation changes from negative to positive so that the final result would be as follows:

$$400-100+\$2.00=R, \text{ which equals } 302$$

These changes of sign in carrying out the computation to obtain the desired ultimate result and to obtain the desired intermediate results require special controls which will be subsequently more fully described.

It will be assumed that a number of cards, each having factors A, B and C punched thereon, are placed in the card magazine of the machine. The first operation is then to close the switch 244 (Fig. 18e) providing current supply for the main driving motor Z. The motor Z drives the A. C.-D. C. generator 52 and the D. C. section supplies direct current to the D. C. buses 245 and 246. Alternating current impulses are supplied to ground and to buss 247. The start key is now depressed to close start key contacts 230 (Fig. 18e) and complete a circuit from the 245 side of the D. C. line through cam contacts FC—1 now closed, through relay contacts B—1 now in the position shown, through the start key contacts 230 and back through relay coil A to the 246 side of the D. C. line. The energization of relay coil A establishes a stick circuit through relay contacts A—1, the stick circuit being completed back through cam contacts FC—2 now closed. The energization of relay coil A also closes relay contacts A—2 (Fig. 18e) and a circuit is completed from the 245 side of the D. C. line through the punch contacts P—1 now closed, through relay contacts A—2, through the stop key contacts 231 now closed, through cam contacts FC—4 now closed to the card feed clutch magnet 248 and back through relay contacts E—1 now in the position shown to the other side of the D. C. line. A card feed now ensues and during this card feed cycle the first card from the supply magazine will be advanced to a point in which the main sensing brushes 109 (Fig. 2) are just about to read the card. At this time the advance sensing brushes 106 and 107 will be over the extra index point positions of the card.

Under the operation which is now being explained, there will be no perforations on the card in either of these extra index point positions and therefore such advance brushes 106 and 107 do not bring about supervisory control. The start key is held depressed to initiate the following card feed cycle or alternatively the start key can be depressed a second time. A further card feed then ensues.

It may be explained that late in the first card feed cycle card lever contacts 112 close, causing energization of relay coil C. The energization of relay coil C closes relay contacts C—1 (Fig. 18a) and on the second card feed cycle upon closure of cam contacts FC—5, current is supplied to the impulse distributor 237 and therethrough to the contact roll 87. As the first card passes the brushes 109, the three factor amounts A, B and C are read therefrom. The A amount is read from the card by brushes designated 109A and this entry is directed into the A accumulator by plug connections at plug board 249, which plug connections extend to plug sockets connected to wires in a cable 250, which cable extends down to Fig. 18d. Here the entry circuits extend to the 251A counter magnets through relay contacts 2—CR1 to 8 and relay contacts 4—CR1 to 8 which are now in the position shown. The multiplicand entry circuit is from brushes 109MC, through plug connections at the plug board 249 to a cable 252 which cable extends to a plug board having plug sockets 253 (Fig. 18b), thence through plug connections at such plug board and through relay contacts 5—CR1 to 8 now in the position shown, to the magnets 251MC pertaining to the MC entry device. The multiplier amount or interest factor C is read from the card by the 109MP brushes and this multiplier entry is entered through plug connections at the 249 plug board directly into the 251MP magnets (see Fig. 18a).

It may be explained that a complete card feed cycle involves two entering cycles. In the card feed cycle just described, when the amounts are read from the card, the first entering cycle is an entering cycle in which the amounts are entered into the various accumulators. During this same entering cycle in which the amounts are being entered into the accumulators the LH accumulator of the machine is being reset. Reset of this accumulator is initiated upon the closure of cam contacts FC—6, at the time shown in the timing diagram and with relay contacts C—1 closed. The closure of cam contacts FC—6 energizes the 254LH reset magnet and brings about reset of the LH accumulator. During reset of the LH accumulator cam contacts FC—3 (Fig. 18e) close to energize relay coil B. The energization of relay coil B shifts relay contacts B—1 to interrupt the circuit to relay coil A through the start key contacts 230 and the closure of relay contacts B—2 provides a stick circuit for both relay coils B and C through either cam contacts FC—1 or the card lever contacts 112 which overlap each other in time of opening and closure in the usual manner. Upon the reset of the LH accumulator, the LH reset contacts 238 (Fig. 18a and Fig. 1), close. Closure of such contacts brings about energization of relay coil N and effects a set up of the cycle controller. The set up of the cycle controller is effected towards the latter part of the reset cycle of the LH accumulator and on the following cycle multiplying operations commence. Such multiplying operations take place at a time when a card is being advanced from beyond the card reading position at brushes 109 down to the receiving tray 118 in the punching section of the machine. In this respect the operation is different from preceding multiplying machines inasmuch as multiplying is initiated earlier in the operating cycle of the machine than heretofore. The energization of relay coil N in the manner previously explained will bring about a closure of stick relay contacts N—1 (Fig. 18a) and establishes a stick circuit through relay coil N, through relay contacts 1—CR—9 now closed. When the multiplier amount or interest factor is being derived from the card certain manually set switches will have been previously set for such an operation. Such switches comprise three-blade contacts 255, 256 and 257 and all of such three-blade contacts are adjustable by a common switch operating member 258 adapted for manual shifting. When the multiplier amounts are to be read from the card, member 258 is shifted to the left hand position as shown to connect the MPRO readout with the cycle controller and column shift magnets and to disconnect the MPRO—1 readout from such column shift and cycle controller magnets. The cycle controller is now set up from the MPRO readout in the usual manner. The cycle controller includes relay coils designated Y$u$, Y$t$, Y$h$ and Y$th$ which have three sets of relay contacts associated therewith in lieu of two sets as heretofore. One set will be given the general designation "1", another set the general suffix designation "2" and the third set the general suffix designation "3". The "1" set of contacts are for stick purposes. The "2" set of contacts are for column transfer purposes and the additional "3" contacts are for controlling certain adding or subtracting transfer and term merging operations. The CS relays have relay coils CS$u$, CS$t$, CS$h$ and CS$th$. In addition to the multi-contact column shifting contacts which are controlled by the column shift relays, each CS unit has an additional control contact pair which will be given the suffix numeral "3", that is CSu—3 is this extra pair of contacts which are adapted to be closed upon the energization of CSu, etc.

If any brush of the multiplier readout MPRO stands on a zero spot, its corresponding Y magnet will be energized. On a zero appearing say in the units order of the multiplier current will flow in from the 245 side of the D. C. line, through wire 259, through contacts 1—CR—9 now closed, through contacts N—1 now closed, up via branch wire 260 to the transverse bus extending over the zero contacts of the MPRO readout and out via the brush in the units order which stands on zero, down through units order 255 contacts now in the position shown, to the Yu magnet and back to the other side of the D. C. line 246. When the Yu magnet becomes energized, its corresponding Y—1 stick contacts will close and the Yu magnet will remain energized. It will be assumed that there is a zero in the multiplier in the units order, but a significant figure in the tens order. Under these conditions contacts Yu—2 will be shifted to reverse position from that shown and contacts Yt—2 will not be shifted because their corresponding Y magnet, viz. Yt, has not been energized.

The machine is now ready to multiply by the amount in the tens order of the multiplier. Upon the energization of relay coil N in the manner previously explained, relay contacts N—2 close. Accordingly, upon the closure of cam contacts CC—1 a circuit is established from the 247 side of the A. C. line, through cam contacts CC—1, through N—2 now closed, through the Yu—2 contacts now in shifted position, through the CSt column shift relay magnet, through the tens order 256 contacts to the tens order of the MPRO readout and out via a brush of this readout standing on say the fifth spot to the fifth line of the group of wires generally designated 261 and down to the fifth or X—5 multiplier relay magnet and back to ground. Energization of the X—5 magnet brings about the multiplying computation and the energization of CSt directs the entries into the proper orders of the RH and LH registers. Multiplication and creation of left and right hand components of partial products are effected by the 233 emitter which emits impulses through the closed multiplier relay contacts. Such impulses flow over the lines generally designated 262LH and 262RH to the LH and RH sections of the multiplicand readout MCRO. It may be here explained that the 262RH lines do not extend directly to the readout, but extend to the readout through supplemental relay controlled contacts 3—CR1 to 8 which are now in the position shown. These contacts 3—CR1 to 8 are provided for a purpose to be hereinafter explained. The selected impulses flow through the MCRO readout to the LH component lines 263LH and to the RH component lines designated 263RH. Lines 263LH and 263RH do not extend directly to the multi-contacts of the column shift relays as heretofore, but extend to these contacts through plug connections at separate plug boards which are designated 264RH and 264LH. After passing the column shift multi-contacts CS—132 and CS—133, the right hand component impulses flow to the 251RH magnets and the left hand partial product impulses flow to the 251LH counter magnets. On the following multiplying cycle, another product is entered pertaining to the thousands order and so on for the complete computation. As the successive multiplying cycles ensue, the cycle controller functions in the usual manner to control the column shift relays to successively shift the partial product entries into the proper columns of the RH and LH accumulators.

It may be explained that by the time the first multiplying cycle has been completed the card has reached the first position in the punch and during the following cycle or cycles of the machine such card is fed in the punch first to the intermediate position and thereafter to the first punching position. Upon the card reaching the first position in the punch, the punch card lever contacts 120 (Figs. 3a and 18e) become closed, energizing relay coil E and causing shift of the relay contacts E—1 to reverse position from that shown. The shift of relay contacts E—1 will cut off current supply to the card feed clutch magnet 248 and prevent further card feed. Also with relay contacts E—1 shifted, current will flow from left side of the D. C. line 246, through E—1, through CC—2 which close at the proper time in the cycle, through the punch clutch feed magnet 154, through the eject contacts P—2 now closed, through relay contacts D—1 now closed to the other side of the line 245. The energization of punch clutch feed magnet 154 initiates the feed of the card through the punch in the manner previously explained. The card is fed in the punch first to the intermediate position and thereafter to the first punching position. It may be explained that a supplementary interlock control is provided to prevent premature punching. Such control will be subsequently described.

When the multiplying cycles are complete, all of the Y magnets will have become energized and all of the Y—2 contacts will have been shifted to reverse position from that shown. All of the Y—3 relay contacts will also have been shifted to closed position. The machine is now ready to transfer the accumulation of partial products in the RH accumulator to the LH accumulator and at the time in the cycle when this transfer occurs, there is a transfer of the amount standing in the MC device to the A accumulator. Such transfer is made with a reversed sign, i. e. in a complementary manner to effect subtraction of the term B from the term A which already stands on the A counter. At this same cycle of operation in the machine, there is a reset of the MP device. With the multiplying cycles completed all of the cycle controller Y—2 relay contacts are shifted and upon the cycle following the last multiplying cycle upon closure of cam contacts CC—1 (Fig. 18a) a circuit is completed traced as follows: from the 247 side of the A. C. line, through CC—1, through contacts N—2 now closed, through all of the shifted Y—2 contacts, through relay coil 1—CR and back to ground. Circuits are also completed through the 254MP reset magnet and through relay coils 3—CR and 2—CR. It may be mentioned that the contacts 257 will be in the position shown to allow current to flow to 254MP and that relay contacts K—2 will be in the position shown to allow current to flow through 3—CR and 2—CR. The RH to LH transfer is then effected. Energization of 1—CR (Fig. 18a) will cause closure of contacts 1—CR1 to 8 and also relay contacts 1—CR—10 (Fig. 18c) and closure of relay contacts 1—CR—11 (Fig. 18e) and the opening of relay contacts 1—CR—5 (Fig. 18a). The closure of 1—CR1 to 8 (Fig. 18c) will permit impulses flowing from the emitter 234, through the RHRO readout to flow over via the transfer lines 265 to the 251LH magnets.

The opening of I—CR—9 (Fig. 18a) will effect de-energization of the Y magnets of the cycle controller and also de-energize relay coil N. De-energization of N breaks down the set up of the cycle controller. Upon the brush of the emitter 234 (Fig. 18c) encountering the extra spot a circuit is completed through relay contacts I—CR—10 now closed to the 254RH reset magnet. The reset of the RH accumulator is initiated late in the RH to LH transfer cycle and reset of the RH accumulator actually is effected in the following cycle. The transfer over of the amount B with reversed sign, i. e. in complementary form to the A counter, is effected in the following manner.

In transferring over the B amounts in complementary form to the A accumulator, the amount should be transfered over complemented to 9 in all columns except the lowest order column. Such lowest order column should be complemented to 10. In effecting such transferring over operation the X—9 multiplying relay is utilized. If this were utilized alone the amount B would be transfered over complemented to 10 in all orders. To prevent the unwanted complementing of the lower orders to 10 the relay contacts 3—CRI to 8 are utilized. Such contacts on this transferring over operation shift to reverse position from that shown and the effect of the shift of the contacts is to cause all orders to be transferred over complemented to 9 in place of being complemented to 10. The X—9 multiplier relay is called into action for this transfer over operation in the following manner. At the time when 3—CR and 2—CR are energized, current also flows through all of the Y—3 contacts now shifted to closed position, through relay contacts K—3 which are in the position shown via a wire 270 to the X—9 multiplier relay coil and back to ground. It may be explained that the purpose of the Y—3 contacts is to prevent undesired energization of either the X—I or X—9 multiplier relay magnets for transfer purposes during the regular multiplying cycles. The impulses flow from the emitter 233, through one set of the X—9 contacts, thence via lines 262RH, through the shifted contacts 3—CR—I—8 thence through one section of the MCRO readout, out via the lines 263RH, thence through wires in a transfer cable 266 down to a plug board 267 (see Fig. 18d), thence via the plug connections at this plug board, through relay contacts 2—CRI to 8 now shifted, down through relay contacts 4—CRI to 8 which are in the position shown, to the 251A counter magnets. The just described operation will have entered the 9's complement of the amount B into the A accumulator. An extra increment of 1 must now be added to the lowest order of the A accumulator to convert the 9's complementary entry into an actual complement. During the 9's complementary entry just described, relay contacts 3—CR—9 (Fig. 18c) are closed and upon the brush of the emitter 233 encountering the extra spot an impulse flows over a wire 268 down through the 3—CR—9 contacts to a magnet 269A. This magnet 269A is disposed in the A accumulator and arranged to trip the carry lever latch pertaining to the lowest order of such accumulator. The carry lever latch is tripped before the actual carrying operation is completed so that by the carrying operation an extra increment of 1 will be added into the lowest order of the A accumulator. The carry lever latch which is tripped by this magnet is the carry lever latch customarily used in such an accumulator and is the carry lever latch or fish hook shown as part 33 in Hollerith Patent No. 974,272. The effect of tripping such carry latch is, upon the operation of the accumulator, to add an extra 1 into the units order just as if there was a previous carry over from a still lower order of such accumulator.

It may be here mentioned that during the cycle in which the complement of B is transferred to A that the MP counter is reset, such reset is effected by the energization of the 254MP reset magnet.

At the present stage in the operation of the machine the A counter has standing upon it a result representing $A-B$. The LH accumulator has standing upon it the result $B \times C$ and the MC accumulator has the amount B alone standing upon it. The machine is now ready to transfer the product of $B \times C$ with reversed sign or in complemental form into the A accumulator and to concurrently transfer such amount with unchanged sign, i. e. in direct number form, into the MC accumulator which contains the amount B. By this operation the final evaluated result will then be standing on the A accumulator and the MC accumulator will have standing thereon the result of the computation $B+(B \times C)$ and the LH accumulator will still have standing upon it the result of $B \times C$.

The manner in which these transfer and merging operations are effected will now be described. During the merging of the RH accumulation of partial products with the LH accumulation of partial products, contacts I—CR—II (Fig. 18e) become closed causing energization of relay coil L. Energization of L causes closure of relay contacts L—I and establishes a stick circuit for L through the 242 reset contacts which are associated with the RH accumulator and now closed. The energization of relay coil L will also cause closure of relay contacts L—2 (Fig. 18a) and late in the RH to LH transfer cycle when cam contacts CC—3 close, a circuit is completed to relay coils 4—CR and 5—CR. Energization of 4—CR and 5—CR will effect shift of contacts 4—CRI to 8 (Fig. 18d) and 5—CRI to 8 (Fig. 18b). At the time current flows to energize 4—CR and 5—CR current flow also occurs through relay contacts J—2 (Fig. 18a) now in the position shown and respectively through the various relay contacts T—3 and T—4 to energize relay coils 7—CR and 8—CR respectively. The energization of 7—CR closes relay contacts 7—CRI to 9 which connect an emitter 236 to emit impulses through the upper section of the LHRO readout device. Such impulses flow out of the upper section of the readout through plug connections at plug board 271b to a cable 272b and up (see Fig. 18b) and through contacts 5—CRI to 8 now in shifted position, to the 251MC magnets. In this way the amount standing on the LH accumulator is added to the amount standing on the MC accumulator so that the MC accumulator now has standing on it the result RI or $B+(B \times C)$.

Concurrently with the energization of 7—CR relay coil 8—CR becomes energized. Energization of 8—CR closes contacts 8—CRI to 9 (Fig. 18d) and allows a complemental emitter 235 to emit impulses through the lower section of the LHRO readout device, the impulses flowing out of this readout device through plug connections at plug board 271a to wires in a cable 272a which extends to the now shifted 4—CRI to 8 contacts and the impulses flow to the 251A magnets. By this operation the 9's complement of the product amount of $B \times C$ standing on the LH accumulator is entered concurrently into the A accumulator while the true number amount is entered into the MC accumulator. When relay contacts 8—CR1 to 9 become closed, extra contacts 8—CR—10 (Fig. 18c) also become closed so that upon the brush of emitter 235 encountering the extra spot an impulse is allowed to flow up through a wire 273, through contacts 8—CR—10 to carry lever trip magnet 269A. This trip magnet trips the carry lever in the lowest order of the A accumulator and causes an extra unit of 1 to be added to the entry in this accumulator. The machine now has the final result of the computation standing in the A accumulator. It has the intermediate result of $B+(B\times C)$ standing in the MC accumulator and it has the intermediate result of $B\times C$ still standing in the LH accumulator.

Before describing the manner of recording results by punching the same back on the card, it may be explained that during the cycle of operation when the transfer of the LH amounts to the MC and A accumulators occurs there is a reset of the RH accumulator. Such reset of the RH accumulator causes contacts 242 (Fig. 18e) to open to de-energize relay coil L by interrupting its stick circuit. With relay coil L de-energized, relay contacts L—2 (Fig. 18a) open to prevent a double transferring over operation. The reset of the RH accumulator can also be used to signify that the machine is ready for the punching of a result or results.

Reference has been previously made to the fact that there was interlocking means provided to prevent premature punching. This interlocking means will now be described. The interlock which is provided is of dual character, one portion is associated with the multiplying machine proper to determine its status and prevent initiation of punching until the multiplying end of the machine is in condition for such punching, the other interlock is on the punching section to determine that it is in proper position for the commencement of result punching. The interlock on the multiplying machine section will first be described.

During the reset of the RH accumulator, reset contacts 241 (Fig. 18e) close, energizing relay coil M and causing closure of contacts M—1 which establish a stick circuit for M through the 240 reset contacts on the MC accumulator, which are now closed. The energization of M also closes relay contacts M—2 (Fig. 18d) and affords current supply to a shiftable plug 274 which is placed by the operator of the machine in a selected one of the plug sockets 275. The socket which is selected for plugging is the socket corresponding to the first column on the record in which result punching is to occur. It will be assumed that the plug 274 is placed in the socket 275a. When the card has escaped in the punch to the first product punching position, the brush 183 will be in contact with the spot 181 which is connected to plug socket 275a. With the punch parts in this position and with relay contacts M—2 closed, current will flow to the strip 182 and energize relay coils S and V. With this arrangement it will be understood that if the card reaches the first punching position prior to the multiplying section of the machine causing the closure of relay contacts M—2 that there will be no energization of relay coils S and V. Conversely if the multiplying end of the machine has caused closure of relay contacts M—2, but if the punch has not fed the card to the first result punching position, there will not be an energization of S and V. This control insures that the card is in the proper position in the punch and that the multiplying machine is in the proper status for such punching.

The energization of relay coil S will close relay contacts S—1 and establish a stick circuit for S and V through the 240 reset contacts of the MC counter now closed. The energization of S will also close relay contacts S—2 and will establish a circuit to the regular reading strip 182b of the punch through the escapement contacts 175. Another circuit will also be established through the usual interposer operated contacts 276 in the punch, to the main punch operating magnet 277, the circuit being completed through relay contacts S—3 which are closed during punching operations. Relay contacts S—3 when open prevent any circuit being completed to the main punch operating magnet 277. Contacts 276 correspond to contacts 94 of the Bryce Patent No. 1,866,995 and to contacts 95 of the Lee and Daly application and British Patent No. 362,529. Magnet 277 corresponds to the punch magnet 54 of the Bryce patent and to magnet 49 of the British patent. The successive punching operations will continue until all of the results are read out and punched.

The readout circuits for reading out intermediate results and the final result will now be described.

The usual reading strip of the punch has its contacts pots 181b connected to plug sockets 278. From these plug sockets, plug connections are made to plug sockets 279 which are wired to the ARO readout and to sockets 280 (Fig. 18c) which are wired to and associated with one section of the MCRO readout and to sockets 281 (Fig. 18d) which are associated with one, lower, section of the LHRO readout. At this point it may be mentioned that if a constant multiplier is being used and set up on the hand setup multiplying devices, plug connections also could be made to sockets 282 (Fig. 18d) to permit reading out of the multiplier from the MPRO—1 readout device which is associated with the hand setup multiplier device.

Referring to Fig. 18d, the punch selector magnets 283 are wired to the 246 side of the D. C. line and transverse bus wiring is provided from these punch selector magnets through the ARO readout, this transverse bus wiring extending into wires in a cable 284 to relay contacts V—1 to 8 (Fig. 18b) which are closed during punching operations by energization of relay coil V, V being energized in the manner previously explained. The other side of contacts V—1 to 8 extend and respectively connect with the 262LH lines which extend to transverse bus wiring in one section of the MCRO readout. The transverse bus lines of the MCRO readout extend to another cable 285 which extends down (see Figs. 18c and 18d) to the transverse bus lines of one lower section of the LHRO readout and these bus lines of this LHRO readout connect with the cable 286 which extends to transverse bus lines of the MPRO—1 readout. Current supply is afforded column by column to these readouts in succession by the brush 183b which successively establishes contact with the spots 181b.

It will be understood that intermediate results and final results can be punched in any desired order on the record card by the proper plugging of the readout devices to the plug sockets 278.

Punching now proceeds column by column and finally after all of the results have been punched back on the card, the card escapes in the punch to beyond the last column position. When the card is in such position beyond the last column position, contacts P—4 (Fig. 18e) become closed energizing relay coil D. The energization of relay coil D causes closure of relay contacts D—1 and brings about an energization of the card eject magnet 192. The card is thereupon ejected from the punch and the action of the eject mechanism causes closure of eject contacts P—3 (Fig. 18a) and P—2 (Fig. 18e). With the eject contacts P—3 closed and upon closure of cam contacts CC—1 a circuit will be established to energize the 254A reset magnet and the 254MC reset magnet, the circuit being completed through relay contacts D—2 and M—3 now closed. Energization of 254A and 254MC brings about reset of the A and MC counters. The reset of the MC accumulator opens the stick circuit for relay coil M (Fig. 18e) and prevents repeated resetting operations of the MC and the A counters.

The machine is now ready to resume card feed and start on a new computation. The reset of the MC accumulator causes the 239 reset contacts to become closed (Fig. 18e) to energize relay coil A. The energization of A closes relay contacts A—2 to re-energize the card feed clutch magnet 248 in the manner which was previously described. A new computation pertaining to a new record follows.

After the last card has been handled, the card lever contacts 112 (Fig. 18e) open to cause de-energization of relay coils C and B. With C and B de-energized, the last card passes to the punch in the usual way and the recording operations are performed on the last card. However, with C and B de-energized, relay contacts C—1 (Fig. 18a) do not close and with these contacts open there is no initiation of reset of the LH accumulator, nor is current supplied to the contact roll 87. The machine operations then automatically terminate after the computation and recording on the last card are complete. Such termination occurs at a point following the first two counter cycles as shown on the timing diagram.

*Operations with multiplier derived from hand setup multiplier device*

When the hand setup multiplier device is to be used in place of reading the multiplier from the record card, the amount of the multiplier is set up on the multiplier setup device and the three-blade contacts 255, 256 and 257 (Fig. 18a) are shifted by shifting the operating member 258 to reverse position from that shown. Under these conditions the Y magnets of the cycle controller and the CS column shift magnets are correlated with the lower section of the MPRO—1 readout device instead of with the MPRO readout device. The operation is then substantially as previously explained except that the factor B is multiplied by the multiplier derived from the lower section of the MPRO—1 readout device in place of the multiplier standing on MPRO and read from the card. Furthermore, if desired, the multiplier amount can be punched upon the card by plug connections made between plug sockets 282 and selected sockets 278 (Fig. 18d). The purpose of the contacts 257 (Fig. 18a) is to cut off the circuit to the 254MP reset magnet to eliminate unnecessary and unwanted reset of the MP accumulator.

The foregoing description as considered with the computation being performed by the machine, was of the general form $A-[B+(B \times C)]$.

The machine also can be set for the performing of a computation of the general form $$A+[B-(B \times C)]$$

and likewise the machine can be set to perform computations of the general form $$A-[B-(B \times C)],$$

or alternatively the machine can be set to perform computations of the general form $$A+[B+(B \times C)].$$

The control of the machine for these adding and subtracting operations can be effected in two ways. One way is by a fixed manual set up of switches. Another way is by card control in which the designations upon the card itself determine the merging of terms by addition and/or subtraction and determine reversing of signs in merging operations or merging with unchanged signs.

For switch control of the machine, two switches 287 and 288 are provided. With the previous computation which has been described, both of these switches 287 and 288 were in open position and the machine performed not only subtraction of the amount of the computation within the brackets from A, i. e. effected a change of sign in merging, but it also effected an addition of the terms of the computation within the brackets to obtain intermediate result R1. If the machine is to be set to perform the computation $A-[B-(B \times C)]$ switch 288 will be thrown to closed position and 287 will be left in open position. On the other hand if a computation is performed of the general form $A+[B+(B \times C)]$, switch 288 is left in open position and 287 will be thrown to closed position. Also if a computation is to be performed of the general form $A+[B-(B \times C)]$ switch 287 and switch 288 would be thrown to closed position. It will be assumed that the switches are to be set for causing the computation according to the general form $A-[B-(B \times C)]$. With these conditions, switch 288 is closed and 287 is open. With 288 closed, relay coil F will be energized upon the closure of relay contacts C—2 under the control of relay coil C, the circuit being completed through cam contacts FC—7 now closed. Energization of coil F will cause closure of stick contacts F—1 to establish a stick circuit for F, back through FC—8. During the feed of a card, cam contacts FC—9 close and with relay F energized, relay coil J will become energized causing closure of stick contacts J—1 and permitting the establishment of a stick circuit for J through reset contacts 243 of the RH counter now closed. After the energization of J, F becomes de-energized upon the opening of cam contacts FC—8 during the card feed cycle. With this type of operation the machine performs the multiplying operations in the previously described manner and relay coil J remains energized during such multiplying operation. When multiplication is complete and when the supplemental current impulse flows through wire 289 under the control of CC—1, the current flow will energize multiplier relay coil X—9 in the previously described manner. The amount B standing on the MC accumulator will be transferred in complemental form into the A accumulator as before but the product amount of $B \times C$ instead of being added to the amount standing on the B accumulator, must be subtracted and accordingly should be transferred to such accumulator in complemental form. Furthermore, the product amount of $B \times C$ instead of being subtracted from the amount on the A accumulator must be merged with a changed sign, i. e. it must be added to the amount on the A accumulator or transferred therefrom in direct number form.

The manner of energizing relay coil J has been previously explained. Upon closure of relay contacts L—2 in the manner previously explained and upon closure of the cam contacts CC—3 (Fig. 18a) current will flow through the J—2 relay contacts now in shifted position and such current flow will energize relay coils 6—CR and 9—CR instead of energizing 7—CR and 8—CR as was the case for the previously described computation. With 6—CR and 9—CR energized, relay contacts 6—CR1 to 9 and 9—CR1 to 9 (Fig. 18d) will be closed. With these relay contacts closed the amount read off from the upper section of the LH accumulator will be transferred in complemental form to the MC accumulator. Also the amount set up on the lower section of the LHRO readout will be transferred over with changed sign and in true number form to the A accumulator.

With the type of computation now under consideration there is a closure of contacts 9—CR—10 (Fig. 18c) and accordingly upon the emitter 235 encountering the extra spot, a current impulse will flow through wire 273 through the 9—CR—10 relay contacts, through the 269MC carry lever latch trip magnet to add an extra increment of 1 into the MC accumulator. Under these conditions the trip latch in the A accumulator is not tripped because the magnet 269A is cut out of circuit by contacts 8—CR—10 now open.

The punching of results, resetting of the accumulators, etc. and resumption of the card feed is the same as for the previously described computation.

When a computation is to be performed according to the general form $$A + [B + (B \times C)] = R,$$

switch 288 will be thrown to open position and 287 to closed position. With switch 287 closed, relay H will be energized upon the closure of relay contacts C—2 under the control of relay coil C, the circuit being completed through cam contacts FC—7 now closed. Energization of coil H will cause closure of stick contacts H—1 to establish a stick circuit over H, back through FC—8. During a feed of the card, cam contacts FC—10 close and with relay H energized, relay coil K will become energized, causing closure of stick contacts K—1 and permitting the establishment of a stick circuit for K through contacts 2—CR—9 now closed. At the time relay coil K becomes energized, relay coil T becomes energized due to the closure of cam contacts FC—11, such closure being concurrent with the closure of cam contacts FC—10. The energization of T closes relay contacts T—1 to provide a stick circuit for T through the 243 reset contacts. After the energization of K and T, relay coil H becomes de-energized upon the opening of cam contacts FC—8 during the card feed cycle. When relay coil K is energized the machine performs the multiplying operations in the previously described manner, but when multiplication is complete and when the supplemental current impulse flows through wire 288 under the control of CC—1, current flow will be diverted away from relay coil 3—CR inasmuch as relay contacts K—2 are in shifted position. Current will, however, flow to relay coil 2—CR. Likewise contacts K—3 are in shifted position so that the current flow in place of going down line 270 to the X—9 magnet, will be diverted to flow to the X—1 magnet through line 290. The effect of energizing X—1 in this manner is to multiply the amount standing on the MC accumulator by 1 and to effect a direct transfer over of such amount B in real number form directly into the A accumulator. At the time such entry is made the contacts 3—CR1 to 8 (Fig. 18b) are in unshifted position inasmuch as with this type of operation relay coil 3—CR does not become energized. The tracing of the flow of impulses need not be repeated but can be briefly referred to. The impulses flow from the 233 emitter through the X—1 multiplier contacts, through the 262RH lines, through the non-shifted 3—CR1 to 8 contacts, through the 263RH lines, through cable 266, down to the plug connections at the 267 plug board (Fig. 18d), through the 2—CR1 to 8 contacts now in shifted position, through the 4—CR1 to 8 contacts in non-shifted position to the 251A magnets. This entering operation will cause the addition of the amount B to the amount A standing upon the A accumulator. During such entry of amount B into A, contacts 2—CR—9 (Fig. 18e) open to cause a de-energization of K. It will be understood that with this kind of an operation relay coils H and K and T, as well, are energized and de-energized once for each card which is computed. It now remains to describe how with this type of computation the product of $B \times C$ is transferred in true number form to both the A and B (or MC) accumulators. The energization of relay coil T in the manner previously described, has caused a shift of the associated relay contacts T—3, T—4, T—2 and T—5 to reverse position from that shown on Fig. 18a. With relay contacts L—2 and cam contacts CC—3 closed, current will flow through the non-shifted J—2 contacts, relay J not now being energized, through the shifted T—3 contacts to relay coil 7—CR and through the shifted T—2 contacts to relay coil 6—CR. Relay coils 8—CR and 9—CR will not become energized on account of the shifting of contacts T—4 and T—5 and because the J—2 relay contacts are in unshifted position. With relay coils 6—CR and 7—CR energized, their corresponding relay contacts 6—CR1 to 9 and 7—CR1 to 9 (Fig. 18d) become closed and current impulses flow from the single emitter 236, through the upper section of the LH readout to the 251MC counter magnets and through the lower section of the LH readout to the 251A magnets. Such operation transfers the product of $B \times C$ as a true number into both the MC and A accumulators.

The only remaining form of computation to be described is that according to the general form $A + [B - (B \times C)] = R$. When this form of computation is to be handled under switch control, both switches 287 and 288 will be thrown to closed position. With such switches closed at the proper time in the cycle there will be an energization of both relay coils H and F. There will then be the attendant and timed energization of relay coils J K and T.

The various stick circuits need not be traced as they are the same for the individual coils as previously described. The ultimate effect of the energization of these relay coils is to cause the shift of the J—2 contacts from the reverse position shown and the shift of the T group of contacts, i. e. T—3, T—4, T—2 and T—5, to reverse position from that shown. With the relay contacts thus shifted, relay coils 8—CR and 9—CR become energized, but previously the energization of these coils, however, the amount standing in the MC accumulator will have been transferred over into the A accumulator as a true number in the manner previously described. The effect of energizing relay coils 8—CR and 9—CR is to cause closure of their related relay contacts 8—CR1 to 9 and 9—CR1 to 9 (Fig. 18d) and upon operation of the 235 complemental emitter the product amount of $B \times C$ standing in the LH accumulator is entered in complemental form into the MC and A accumulators. Furthermore, with this operation it will be noted that contacts 8—CR—10 and 9—CR—10 (Fig. 18c) both are closed so that the extra impulses flowing up line 273 will energize both the 269A and 269MC carry lever trip magnets. By this operation the product of $B \times C$ will be subtracted from the amount standing in the MC accumulator and from the amount standing in the A accumulator.

When the foregoing transferring operations have been completed the RH reset contacts 243 open to de-energize relay coils J and T. It may be explained that relay coils H and F are pick-up coils, that relay coils K and T are picked up under the control of H and that relay coil J is picked up under the control of F and that according to the selective energization or non-energization of relay coils T, K and J, there is a selective transfer of amounts into the accumulators of the machine from the LH accumulator and from the MC accumulator. In various combinations different transferring and merging operations are provided for. With coils T, K and J all de-energized, the amount of B in the MC accumulator is subtracted from the amount A in the A accumulator and the product amount of $B \times C$ is subtracted from the amount in the A accumulator and added to the amount in the B accumulator. If relay coil J alone becomes energized and T and K remain de-energized, the amount B is subtracted from A and the amount $B \times C$ is added to A, but subtracted from B. If relay coils K and T become energized and relay coil J remains de-energized, the amount B will be added to A and the amounts of $B \times C$ will be added to both A and to B. If all of the relay coils T, K and J are energized, the amount B will be added to A and the amount $B \times C$ will be subtracted from both A and B.

When the machine is to be used under record card control for selectively determining adding and subtracting operations the switches 287 and 288 are both thrown to open position. The controlling record cards themselves are furthermore perforated or not perforated in the extra index points of certain columns in a selective manner according to the type of computations to be performed. These extra controlling index perforations are disposed in the 11th and 12th index point positions of the record card, a hole in the 11th position permitting the establishment of a circuit by brush 106 and a hole in the 12th position permitting the establishment of a circuit by brush 107. The control will be by selectively perforating the records or omitting perforations, either wholly or in combinations. For computations of the general form $A-[B+(B \times C)]$ there will be no perforations at all of the records and the controlling effect will be just the same as if switches 287 and 288 were left open. For computations of the general form $A-[B-(B \times C)]$ each record will have a hole punched in the 11th extra index point position, but no hole punched in the 12th extra index point position. Encountering such a record the control will be just as if switch 288 were closed and 287 were left open. For computations of the general form $$A+[B+(B \times C)]$$

there will be no hole punched in the 11th position but there will be a hole punched in the 12th index point. This control will be the same as if switch 288 were open and 287 were closed. For computations of the general form $$A+[B-(B \times C)]$$

there will be holes punched in both the 11th and 12th index point positions and the effect will be the same as if both switches 287 and 288 were closed.

When the machine is operating under extra point record card control the pick up circuits for relay coils H and F through cam contacts FC—7 is so timed that the relay magnets H and F cannot be energized until after a card has reached a position in which the 12th index point position is under brush 107 and in which the 11th index point position is under brush 106. This control also applies to the time of closure of the pick up circuits when the switches are utilized.

It may be explained that upon the feed of a card following the energization of H and/or F that there is a transfer over of the control or to relay coils K and T and/or J, and at this time there is a de-energization of relay coil H and/or F. Such coils K and T and/or J are retained energized until the operations which they control has been completed. In the meantime there may have been a re-energization of H and/or F from and under the control of the following card, but such re-energization will not become effective for transfer of control to the other relay coils until the subsequent part of the card feed cycle in which the card passes the main sensing brushes 109. Such delayed action control is provided for by the timing of the cam contacts FC—9, FC—10 and FC—11.

The purpose of the just described delayed action control is to prevent a following card having a different control from disturbing the control provided by a preceding card. There is therefore a delayed action control whereby there may be an overlapping of the energization of the pickup coils with the controlling energization of the controlled relay coils. Such overlapping energization does not disturb the proper functioning of either the pickup coils H and F or the control relay coils J, K and T.

It may be further explained that the alternative controls just described by the manually set switches 287 and 288 or by the brushes 106 and 107 function irrespectively or whether or not the multiplier factor which is used in the computation is derived from the record card or by the fixed multiplier setup device.

Control operations are also possible with combined switch and card control. One of the switches 287 and 288 may be permanently closed and the other control obtained from the record card. It is only necessary on such combined operations to close the switch which is not correlated with the record card control, i. e. if switch 287 was kept permanently closed the record card control should come from brush 106 and vice versa if 288 was permanently closed the record card control should come from brush 107.

By reference to Figs. 19 and 19a the sequential timing of various operations are set forth. It is not necessary to describe this timing diagram in detail but a few of the principal features of timing can be briefly alluded to.

The first two counter cycles delineated represent one card feed cycle. In the first of these cycles the factor amounts are read from the card, the cycle controller is set up and the LH accumulator is reset. The second cycle is a cycle involved in passing the card to the R position in the punch. In the present machine, multiplication is initiated at the end of the first cycle and occurs during the second cycle which is at an earlier stage than in previous machines. The feed of the card in the punch occurs in the multiplying cycle which followed the first multiplying cycle which first multiplying cycle overlaps into the card feed cycle. Having completed multiplying, the fifth counter cycle delineated on the timing diagram shows RH to LH transfer, the reset of the MP accumulator and the transfer over of an amount either direct or complemental from MC to the A accumulator. This is the merging of B with A. The next entering cycle delineated shows the transfer over of amounts from the LH accumulator concurrently to the MC accumulator and to the A accumulator direct or complementary selectively to both. This part of the operation is involved with transferring $B \times C$, both to the A accumulator and to the MC accumulator. In this same entering cycle the RH accumulator is reset. Following this are two cycles provided for punching out the result on the record. If necessary more cycles could be consumed at this point if the punching takes a longer time. The machine is arranged so that further operations are delayed until punching is complete. The last cycle delineated shows a reset of the A accumulator and a reset of the multiplicand accumulator. While three multiplying cycles are delineated any number of such cycles could be employed.

In certain cases it may be desired to use the machine in problems which involve the evaluating of polynomial expressions in which there is no multiplication involved in the polynomial term of such expression, for example the machine may be required to compute problems according to the general form $A \pm (B \pm C)$.

The present machine is adapted for such computations and in setting up the machine for a computation of this sort the 251MP magnets (Fig. 18a) would be left unplugged to the brushes 109MP, no plug connections being made to the 251MP magnets. Plug connections from the brushes 109MP, pertaining to the multiplier field of the card would, however, be made to one side of a set of multiple contacts W—1—4 (Fig. 18a) and from the other side of these contacts plug connections would be made to plug sockets 300 (Fig. 18c) which are wired in circuit to the 251RH magnets. A switch 301 (Fig. 18e) would also be thrown to closed position for this type of operation and with switch 301 closed relay coil W would be energized during the time factors are read from the card and with cards in the machine under control of relay coil C which effects closure of relay contacts C—3 and under control of cam contacts FC—12. Under all other machine operations relay coil W is de-energized and the energization of W will close the W—1—4 contacts to permit the entries to be made direct from the card. With the machine plugged up in this manner, upon the operation of the machine, the monomial terms A and B would be read from the card as before and entered into the A accumulator and into the MC accumulator. The C term of the computation would be read directly from the card and entered into the RH accumulator. The regular operating cycle of the machine would then ensue, but inasmuch as there would be no entry into the MP accumulator, the cycle controller would have a complete zero set up upon it so that there would be no multiplying cycles. The machine would immediately proceed with an RH to LH transfer to transfer the amount C from the RH accumulator into the LH accumulator and from this point on the computation would be handled as before described, that is B would be merged with the amount in A in a positive or negative manner and likewise the term C standing in the LH accumulator, would be merged with the merged result standing in A in a positive or negative manner and would likewise be merged with the term B standing in B in a positive or negative manner. When the machine is used in this manner there would be no read-out for punching back on the card either from the MP—1 counter or from the LH accumulator because the amount C would already appear on the card.

When the machine is used in this manner the hand set-up device should preferably be set at zero so that it should not bring about multiplying computations. The hand setup device for the multiplier could, however, have a multiplier set up therein in which case there would be multiplication of the B amount by this hand set up multiplier, factor D for example, and then in the operation of the machine the amount directly read from the card by the 109MP brushes would ultimately become entered into the LH accumulator along with the product of $D \times B$. With the machine set in this manner the machine would compute according to the general equation $A \pm [B \pm (BD+C)]$.

While it has been stated in performing computations according to the general form $$A \pm [B \pm (B \times D + C)]$$

that the term D of the computation was derived from the fixed hand setup device, it will be appreciated that such term D likewise can be derived directly from the field of the record card. In this case all four terms entering into the merging and combining computations would be derived from the record card.

Figure 20:
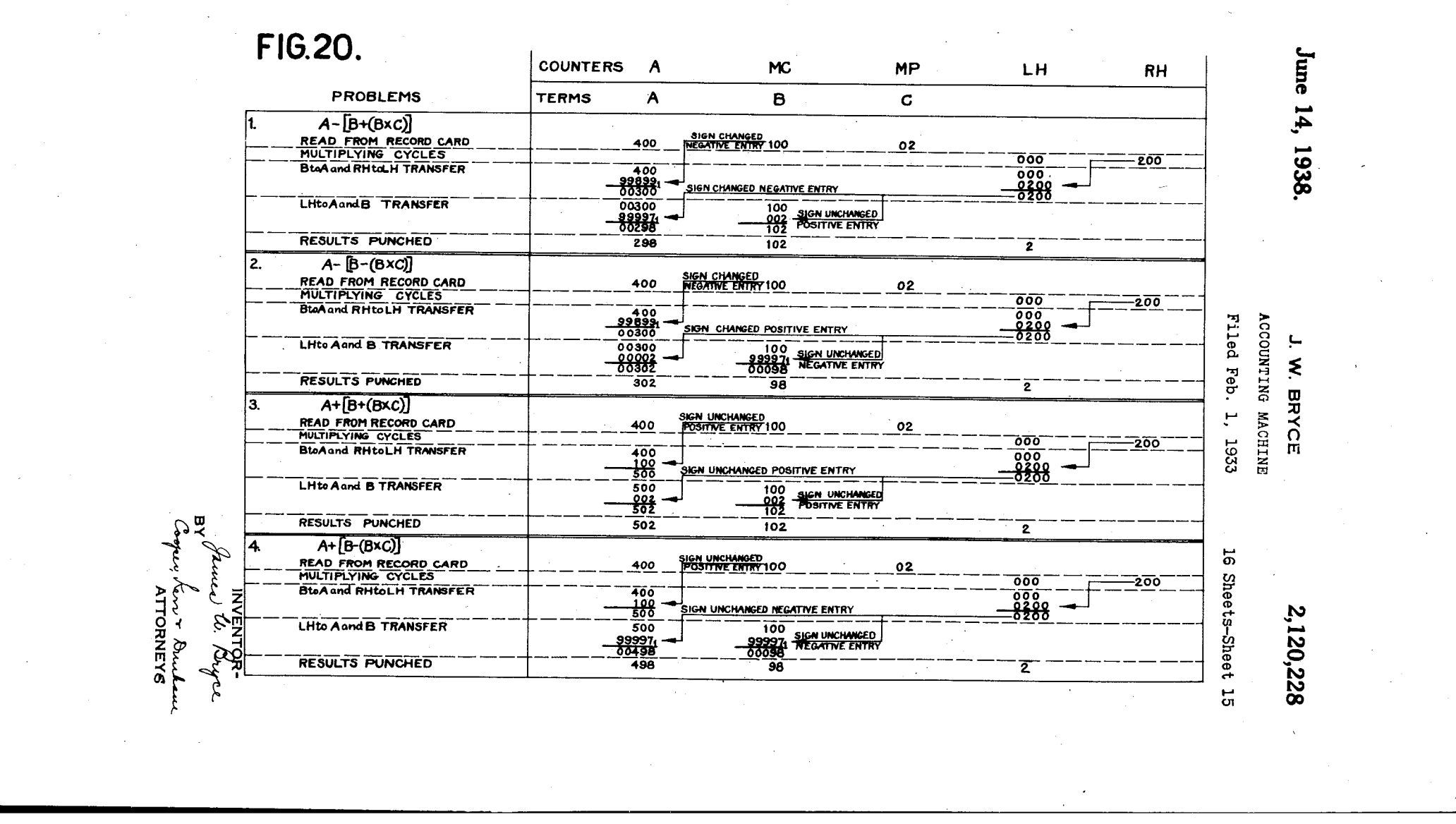

Figure 20 shows typical computations performed by the machine wherein the three terms A, B and C which enter into the computation are all read from the record card. The computations in different machine cycles are shown, the multiplying cycles being grouped together and the entries are given identifying legends as to the matter of change of signs of positive and negative entries. It will be noted that when the term B is merged with A that the sign is changed and an entry is made in a negative manner. The same applies to the entry of $B \times C$ into the A accumulator. However, upon the entry of $B \times C$ into the B accumulator the sign is unchanged and the entry is made in a positive manner.

In the second typical computation the merging of term B with the A term in accumulator A involves a change of sign with a negative entry. The merging of the product amount into the A accumulator involves a change in sign ultimately providing for a positive entry. However, on the entry of the product amount into the B accumulator there is an entry with unchanged sign, but the entry is of negative character.

In typical computation three, all entries are made with unchanged signs and are of positive character.

According to computation four, the signs are all unchanged, but in transferring the product $B \times C$ to the B accumulator, the entry is made in a negative manner.

Referring to Fig. 21, the computations here illustrated are those of the type wherein three terms A, B and C are read from the card but in which in place of having a multiplication of $B \times C$ the computations are according to the typical form $A \pm [B \pm C]$. The computations illustrated are those of $A - [B+C]$ and $A + [B+C]$.

It will be understood that the machine is also capable of effecting other computations $$A - [B-C] \text{ and } A + [B-C].$$

In the computation numbered 1. of Fig. 21, the sign is changed and the entry is negative. In merging B with A the sign is changed and the entry is made in a negative manner. In merging C with B, however, the sign is unchanged and the entry is positive.

In the numbered 2. computation, Fig. 21, the signs in each instance are unchanged and the entries are made in positive manner.

Figure 22 shows typical computations wherein the term D is derived from the hand setup device and wherein the terms A, B and C are derived from the record card.

While Fig. 22 only illustrates typical computations $A - [B - (BD+C)]$ and $A + [B - (BD+C)]$ the machine also can compute computations of the general form $$A - [B + (BD+C)] \text{ and } A + [B + (BD+C)].$$

In typical computation numbered 1. the entry is made with the sign changed and with a negative entry when B is merged with A in the A counter and when the polynomial term $BD+C$ is merged with A the entry is made with its changed sign but with the plus entry. However, when the polynomial term $BD+C$ is merged with B the entry is made with sign unchanged but the entry is negative.

In typical computation numbered 2. (Fig. 22) B is merged with A with sign unchanged and with a positive entry. The polynomial term $BD+C$ is merged with A with sign unchanged but with the negative entry. The same also applies when the polynomial term is merged with B.

By the terms "merge" or "merging" as used in the present specification and claims, I mean "to calculatively combine", or "the calculative combining of" amounts by addition or by subtraction or by addition and/or subtraction. The terms are used in the generic sense and are to be construed to cover addition alone or subtraction alone as well as to cover either addition or subtraction.

What I claim is:

1. An accounting machine with a multiplicand accumulator, and with an accumulator for receiving amounts therefrom, multiplying devices controlled by said multiplicand accumulator and result recording means controlled by said multiplicand accumulator, and comprising readout means controlled by said multiplicand accumulator provided with multiple readout sections, means for rendering both sections effective for controlling operations upon multiplying operations, means for bringing one section into operation when there is to be a read out for transfer to another accumulator and means for bringing the other section into operation when the result is to be read out from said multiplicand accumulator.

2. An accounting machine comprising a first accumulator, a second accumulator and a third accumulator, an entry receiving device, amount entry means for entering amounts by an entering operation into the first and second accumulators, means for entering another amount into said entry receiving device, said amounts so entered comprising the monomials of a polynomial expression, the amount entered into the second accumulator and into the other entry device also comprising the factors of a multiplying computation, multiplying means for multiplying such factors and for entering the product thereof into the third accumulator, means for completely evaluating the polynomial expression in the first of said accumulators, said polynomial expression including a polynomial term preceded by a significant algebraic sign, and said polynomial term including monomials having significant algebraic signs, said evaluating means comprising transfer means intermediate the second accumulator and the first accumulator normally adapted to transfer according to a given algebraic sign, and transfer means intermediate the third accumulator and the first accumulator normally adapted to transfer according to a given algebraic sign, selectively conditioned sign signifying means predetermining the sign preceding the polynomial term and means controlled thereby for causing the transfer means for the monomials of the polynomial term into the first accumulator to transfer in reversed sign relation when the sign signifying means is conditioned to predetermine that the preceding sign is minus, and in non-reversed relation when conditioned to signify that the preceding sign is plus.

3. The invention set forth in claim 2 in which means is provided for separately evaluating the polynomial term in the second accumulator, said means comprising transfer means intermediate the third and second accumulators, and means for causing the transfer of monomial product amount from the third to the second accumulator in non-reversed sign relation irrespective of the conditioning of said sign signifying means.

4. An accounting machine including multiplying devices and a punch of the successively acting column by column repetition punching type for punching computed results and an interlocking control means of dual type comprising coacting means for insuring that multiplying operations are complete and that the punching mechanism is in proper columnar position for the initiation of result punching for preventing premature initiation of punching operations by said punch, said last mentioned means comprising a selectively positionable plug.

5. An accounting machine comprising a calculating section and a punch controlled thereby of the successively acting column by column repetition punching type and inter-control means for preventing premature initiation of punching comprising means which compels the punching mechanism to reach a pre-selected column of any one of several columns from which selection may be made by the operator and coacting means to compel calculating to be complete, both of said means inter-controlling the initiation of result punching.

6. An accounting machine for effecting computations of the general form $A \pm [B \pm (B \times C)] = R$ and for also obtaining the intermediate results $R1 = B \times C$ and $R2 = B \pm (B \times C)$, comprising receiving means for the C term, and means directing the entry of such term thereinto, result receiving devices for separately receiving results R, R1 and R2, means directing the entry of terms A and B respectively into the result receiving device for R and for R2, means controlled by the receiving means for the C term and the R2 receiving device for multiplying $B \times C$ and entering the product into the result receiving device for R1, means to establish entry relations from receiving device to receiving device for the transfer of amounts from device to device so that B and A and R1 and A can be algebraically added together in the result receiving device for R and so that R1 and B can be algebraically added together in the result receiving device for R2, means including transfer means for causing algebraic addition of the aforesaid terms, and means including control means for the transfer means to selectively cause positive or negative transfers.

7. An accounting machine comprising an accumulator having accumulator magnets, entry circuits to the accumulator magnets, a pair of other accumulators each with read out means associated therewith, a set of sensing brushes and means for selectively associating the entry circuits with the brushes or with the read out means of one or the other of the two accumulators, said last mentioned means upon effecting one association cutting off other possible associations.

8. A record controlled accounting machine for computing and completely evaluating and recording the evaluation of a polynomial expression, one of whose terms is itself a polynomial and for applying the rule of signs when required in such evaluation, said machine comprising reading devices for reading monomials of a polynomial expression from a record, entry receiving means receiving such monomials, sign identifying means including record reading means for reading sign identifications from the record for certain of the terms of the polynomial, including the sign preceding the polynomial term, algebraic amount transferring devices controlled by the sign identifying means which is under control of sign identifications from the record for completely transferring amounts from receiving means to receiving means and causing the algebraic sum of the entire polynomial expression to be set up in one entry receiving means, said sign identifying means taking into account the sign preceding the polynomial term in controlling such transferring operations, and recording devices brought into operation when the transferring and algebraic summing is completed for recording the complete evaluation of the polynomial expression upon the record from which the monomials were derived.

9. A record controlled accounting machine for computing and completely evaluating and recording the evaluation of a polynomial expression one of whose terms is itself a polynomial and for applying the rule of signs when required in such evaluation, said machine comprising reading devices for reading certain monomials from a record and including means for reading sign identifications from said record, entry receiving means receiving such monomials, sign identifying means for certain of the terms of the polynomial expression including the sign preceding the polynomial term, said sign identifying means comprising manually settable means acting cooperatively with the aforesaid record means which read sign identification from the record, algebraic amount transferring devices controlled by the sign identifying means for transferring amounts from receiving to receiving means and causing the algebraic sum of the entire polynomial expression to be set up in one entry receiving device, said sign identifying means taking into account the sign preceding the polynomial term for controlling transfer operations and recording devices brought into operation automatically when transferring and algebraic summing is completed for recording the complete evaluation of the polynomial expression upon the record from which the monomials were derived.

10. An accounting machine including means for entering a plurality of terms A, B and C, accumulators for retaining entered terms A and B, which terms as entered are in themselves monomials, means receiving the C term, means controlled by the accumulator into which the B term is entered and by the means upon which the C term is received for multiplying together the terms B and C, means upon which the product $B \times C$ is set up, means for transferring the B term from the B term accumulator to the accumulator receiving the A term whereupon a sum of the two terms is set up for retention in the accumulator receiving the A term entry, means for transferring the product of $B \times C$ from the means upon which said product is set to the last mentioned A accumulator which is retaining the sum of B and A, whereupon the complete sum is set up in such accumulator for retention therein, and means for transferring the product of $B \times C$ from the means upon which said product is set to the accumulator receiving the B term entry, whereupon the sum of $B \times C$ and B is set up in such accumulator.

11. A record controlled accounting machine with means for concurrently reading a plurality of separate amounts constituting separate terms of a problem from a common record, receiving means receiving such amounts, means for algebraically transferring amounts from receiving means to receiving means for algebraic summation of said terms, and record controlled means and means conditioned thereby for selectively controlling the transfer means whereby amounts are subtracted or added in certain of said receiving means in accordance with sign identifications upon the record from which the amounts to be algebraically added were read.

12. An accounting machine with one accumulator which first receives a multiplicand entry, a multiplier entry receiving device, multiplying means including result receiving means, said multiplying means being controlled by the aforesaid multiplicand accumulator and by the multiplier receiving device, another accumulator receiving another entry, means to transmit the amount in the multiplicand accumulator to the said other accumulator for algebraic addition therein, means for selectively controlling the transmitting means to determine whether the transmission is to be positive or negative, means for causing another entry to be made and directed into said multiplicand accumulator for algebraic addition therein, said entry being derived from the result receiving device, including selective control means for said entry causing means to determine whether the entry is to be made positively or negatively, said entry being a calculated amount based upon the amount of the original entry in the multiplicand accumulator and the amount entered into the multiplier receiving device and means for reading out the result of such last mentioned algebraic addition from said multiplicand accumulator and for reading out the result in said other accumulator.

13. An accounting machine of the record controlled type with means for handling records one by one in succession, means for concurrently reading from each record a plurality of terms of a to be performed algebraic adding computation, including in combination receiving means concurrently receiving the plurality of terms under the control of the reading means, algebraic transfer means cooperating with the receiving means for transferring amounts from receiving means to other receiving means, means for causing such transfer by the transfer means so that a plurality of terms read from a common record are algebraically added and set up in a particular receiving means, means individually controlled from each record by sign identifications upon each record which relate to certain entered terms for controlling the cooperation of the transfer causing means and the transfer means which cooperate with the receiving means, multiplying means controlled by certain entry receiving means for multiplying two entered terms and for controlling the setting up of a product upon a further receiving means and means including algebraic transfer and control means for causing the product to be algebraically added in one of said first receiving means.

14. The invention set forth in claim 10, wherein the transfer means are capable of algebraic transfer operations and wherein means are provided to selectively control said transfer means to cause positive or negative transferring of the terms.

15. A record controlled accounting machine with means for concurrently reading a plurality of amounts from a common record, a plurality of entry receiving means for concurrently receiving the amounts so read, means including transfer means intermediate said entry receiving means for algebraically adding such amounts together into a result amount, said transfer means being adapted to transfer amounts negatively or positively, and a record controlled means controlled by sign identification upon the records from which the amounts which are to be algebraically added were read for selectively controlling the aforesaid transfer means to provide for addition or subtraction of the amounts.

16. A machine of the class described, including in combination, a sensing station with sensing means for analyzing a record having more than two data representing fields, a plurality of entry receiving devices one for each field of the record which receive entries from the record under the control of the aforesaid sensing means, transfer means between the said receiving means, means at the sensing station for sensing a special record perforation, and means controlled by said last named means for controlling the transfer means and causing the subtracting from the data contained in one receiving means of the data contained in each of the other receiving means to obtain a result equalling the amount on one card field minus the amounts in the other fields.

17. A cyclic record controlled calculating machine comprising in combination analyzing means for concurrently sensing data in a plurality of fields of a record card, supplemental analyzing means for sensing each record for sign characteristics, calculating means including data receiving means for receiving the data sensed by the analyzing means, transfer means intermediate the said receiving means for transferring amounts from receiving means to receiving means, and means controlled by the supplemental sensing means including sequentially operable control means for the transfer means for sequentially and during successive cycles of operation of the machine causing selective additive or subtractive transfer of amounts in each of a plurality of receiving means to be effected in successive machine cycles into the data receiving means for another amount.

18. In a machine of the class described, including in combination, means for concurrently sensing perforations representing amounts in a plurality of fields in a single record card, a plurality of entry receiving devices, said sensing means controlling the entering of an amount from each of said fields of the record card into a related one of said devices, an accumulator, means including transfer means and means cooperating with the entry receiving devices and control means for causing amounts in said devices to be transferred to said accumulator in succession, supplemental card sensing means for sensing the records for sign characteristics, and means controlled thereby to control the control means for the transfer means to cause amounts to be transferred in complementary form from said devices to said accumulator.

19. In an accounting apparatus in combination, with a plurality of accumulators, record sensing means controlling amount entries thereinto, means including algebraic transfer means and control means therefor for automatically transferring in succession in successive transfer cycles the amounts in certain of said plurality of accumulators to another accumulator, supplemental sensing means for sensing the records for sign characteristics, and means controlled thereby for selectively controlling the control means for the transfer means to cause the transfer means to selectively transfer each amount as a direct amount or in the form of a complement.

20. A record controlled accounting machine with an entry receiving device which receives an original entry, an accumulator also receiving an original entry concurrently with the entry in said receiving device and having means including transfer means between it and the entry receiving device so that either the amount in the entry receiving device or the complement thereof may be transferred to the accumulator, control means for said transfer means to provide for the transfer of an amount or the complement thereof, record sensing means to sense sign identifying characteristics upon a record and means controlled thereby for controlling the aforesaid control means selectively whereby addition or subtraction is effected automatically and selectively under record card control.

21. An accounting machine with means for entering the monomial terms of a polynomial expression comprising a first accumulator, a second accumulator and a third accumulator, means for completely evaluating a polynomial expression in the first of said accumulators, said polynomial expression including a polynomial term preceded by a significant algebraic sign, and said polynomial term including monomials having significant algebraic signs, said evaluating means comprising transfer means intermediate the second accumulator and the first accumulator normally adapted to transfer according to a given algebraic sign, and transfer means intermediate the third accumulator and the first accumulator normally adapted to transfer according to a given algebraic sign, selectively conditioned sign signifying means predetermining the sign preceding the polynomial term and means controlled thereby for causing the transfer means for the monomials of the polynomial term into the first accumulator to transfer in reversed sign relation when the sign signifying means is conditioned to predetermine that the preceding sign is minus, and in non-reversed relation when conditioned to signify that the preceding sign is plus.

22. An accounting machine with means for entering terms of a polynomial expression for computation, comprising a first accumulator, a second accumulator and a third accumulator, means for completely evaluating a polynomial expression in the first accumulator, said polynomial expression including a polynomial term preceded by a significant algebraic sign, and said polynomial term including monomials having significant algebraic signs, said evaluating means comprising transfer means intermediate the second accumulator and the first accumulator normally adapted to transfer according to a given algebraic sign, and transfer means intermediate the third accumulator and the first accumulator normally adapted to transfer according to a given algebraic sign, selectively conditioned sign signifying means predetermining the sign preceding the polynomial term and means controlled thereby for causing the transfer means for the monomials of the polynomial term into the first accumulator to transfer in reversed sign relation when the sign signifying means is conditioned to predetermine that the preceding sign is minus, and in non-reversed relation when conditioned to signify that the preceding sign is plus, means for also separately evaluating the polynomial term of the polynomial in the second accumulator, said means comprising transfer means intermediate the third and second accumulator, and means for causing a transfer to be directed into the second accumulator in non-reversed sign relation irrespective of the conditioning of said sign signifying means.

23. A record controlled accounting machine comprising entry means for deriving a plurality of amounts to be entered into the machine from a common record, a first accumulator receiving one amount from a record, a second accumulator receiving another amount from a record and a third accumulator receiving another amount from the record, means for completely evaluating a polynomial expression including said amounts as monomials thereof in the first of said accumulators, said polynomial expression including a polynomial term preceded by a significant algebraic sign, and said polynomial term including monomials having significant algebraic signs, said evaluating means comprising transfer means intermediate the second accumulator and the first accumulator normally adapted to transfer according to a given algebraic sign, and transfer means intermediate the third accumulator and the first accumulator normally adapted to transfer according to a given algebraic sign, selectively conditioned sign signifying means predetermining the sign preceding the polynomial term and means controlled thereby for causing the transfer means for the monomials of the polynomial term into the first accumulator to transfer in reversed sign relation when the sign signifying means is conditioned to predetermine that the preceding sign is minus, and in non-reversed relation when conditioned to signify that the preceding sign is plus, and means for controlling the aforesaid sign signifying means from the record from which the amounts which were entered into the first and second accumulators were derived.

24. An accounting machine with means to algebraically evaluate a plurality of entered terms into one result, and means to algebraically evaluate the same plurality of entered terms with another entered term to obtain a second result, the aforesaid last two mentioned means including receiving devices for entered terms and transfer means intermediate said receiving devices, control means for the transfer means, said control means including sign determining means to cause the transfer means of the first mentioned evaluating means to effect algebraic adding operations invariably according to the setting of said sign determining means, and additional devices including further sign determining means to selectively control the transfer means of the second mentioned evaluating means, said second sign determining means controlling said last transfer means variably for a given setting thereof depending upon the setting of the first sign determining means.

25. The invention according to claim 24 wherein the sign determining means comprises manually settable control means.

26. The invention according to claim 24 wherein record controlled devices responsive to designating indicia upon a record are provided for controlling said sign determining means.

27. In an accounting machine for adding certain numbers and multiplying certain numbers, comprising receiving means for receiving numbers including a multiplier and multiplicand, multiplying means controlled by multiplicand and multiplier receiving means, said multiplying means including multiplication control means for controlling multiplication by "one" to "nine", means calling into action a multiplication by "one" control means and the multiplicand receiving means for positively adding the multiplicand number to another number in the receiving means for said last number.

28. An accounting machine for subtracting certain numbers and multiplying certain numbers, comprising receiving means for numbers including the multiplier and multiplicand, multiplying means controlled by multiplier and multiplicand receiving means, said multiplying means including multiplication control means for controlling multiplication by "one" to "nine", means calling into action a multiplication by "nine" control means and the multiplicand receiving means, and supplemental control devices associated with said "nine" control means and the multiplicand receiving means for causing subtraction of a multiplicand number from another number in the receiving means for said last number when said "nine" multiplication control is called into action.

29. An accounting machine with multiplying means for multiplying amounts and with means for algebraically summing up amounts, said machine comprising multiplicand entry receiving means and other entry receiving means, said multiplicand entry receiving means having a multiplicand readout cooperating with said multiplying means for controlling multiplying operations in accordance with the entered multiplicand, and supplemental means for utilizing said read-out and elements of said multiplying means for control of algebraic summation of the entered multiplicand number with the number entered into the other receiving means.

30. An accounting machine for effecting computations of the general form $$A\pm[B\pm(B\times D+C)]=R$$

and for also obtaining the intermediate results $R1=B\times D+C$ and $R2=B\pm(B\times D+C)$, comprising result receiving devices for separately receiving a result R, R1 and R2, means for receiving C and D terms, means for transferring term C from its receiving device so that it ultimately becomes entered in the result receiving device for R1, means controlled by the receiving devices for terms B and D for multiplying $B\times D$ and entering the product into the result receiving device for R1, means for directing entry of terms A and B respectively into the result receiving device for R and R2, means for transferring the R1 result into the receiving device for R2, means for transferring the B entry from its receiving device to the R receiving device, means for transferring the said R1 result from its receiving device into the device for receiving the R result, and means for controlling the several transfer means to determine the algebraic sign of transfer operations whereby the three separate results are obtained in their respective receiving devices.

31. An accounting machine for effecting computations of the general form $A\pm[B\pm C]=R$ and for also obtaining the intermediate result $B\pm C=R1$, comprising result receiving devices for separately receiving results R and R1, receiving device for the C term, means for directing the entry of the C term thereinto, means for directing the entry of terms A and B into result receiving devices R and R1 respectively, means for transferring the C term from its receiving device so that it is ultimately entered into the result receiving device for R1, means for transferring the B term from its receiving means to the R result receiving device, means for transferring the C term from its receiving device to the R result receiving device and means for controlling the several transfer means to determine the algebraic sign of transfer operations whereby the desired results are obtained in the respective receiving devices.

32. An accounting machine for effecting computations of the general form $$A\pm[B\pm(B\times C)]=R$$

and for obtaining intermediate results $B\times C=R1$ and $B\pm(B\times C)=R2$, comprising receiving means for the C term, and means for directing the entry of such term thereinto, result receiving devices for separately receiving the three results R, R1 and R2, means directing the entry of terms A and B respectively into the result receiving device for R and R2, multiplying means controlled by the B term receiving device and the C term receiving means for effecting multiplication of $B\times C$ and setting up the product upon the result receiving device for R1, means including transfer means to effect algebraic addition of B, R1 and A in the result receiving device for R, means including transfer means to effect algebraic addition of R1 and B in the result receiving device for R2, and means for controlling the several transfer means to determine the algebraic signs of the several addition operations.

33. In an accounting machine, with cyclic operation control means, record controlled means for concurrently reading a plurality of separate amounts relating to a common problem, receiving means controlled thereby for concurrently receiving said amounts, means for algebraically transferring amounts from receiving means to receiving means following entry of items, means for controlling said transfer means for determining the algebraic sign of transfer, selectably settable determining means for the transfer control means whereby transfers may be effected with variable signs, record controlled sign signifying means, and means automatically rendered operative and effective during transfer operations by the cyclic operation control means and under control of the record conditioned sign signifying means for automatically and selectively setting said determining means whereby the same controls the transfer control means to provide for transfer with selected variable signs as signified by said signifying means.

34. In an accounting machine, algebraic calculating means including accumulators and algebraic transfer means therebetween for evaluating polynomial expressions composed of terms entered in said accumulators, which expressions include a polynomial term including monomials, sign selecting control means for the algebraic transfer means to control the same selectively for plus or minus transfers, sign determining means for the plus or minus sign preceding the polynomial term, and representing means for determining the sign of monomial terms of the polynomial term, and variable controls for the aforesaid sign selecting control means controlled by the monomial sign representing means and said sign determining means when the sign determining means signifies a plus sign for effecting selection according to represented monomial sign and controlled by said sign representing means and by said sign determining means to control the sign selecting means to reverse signs as determined by the monomial representing means when the sign determining means is conditioned to represent a minus sign.

35. A calculating machine for computing and completely evaluating a polynomial expression, one term of which is itself a polynomial and for applying the rule of signs by causing changes of sign when required by such evaluation, said machine comprising entry receiving devices for receiving the monomials of a polynomial expression, sign determining means conditioned in correspondence to the algebraic sign preceding the polynomial term, sign determining means conditioned according to the sign of the monomials, algebraic amount transferring devices intermediate certain of the aforesaid entry receiving devices for transferring to and causing the algebraic sum comprising the amount of the entire polynomial expression to be accumulated in one entry receiving device, means for controlling said transfer devices in accumulating said algebraic sum jointly by both of said sign determining means according to the conditioning thereof, algebraic amount transferring devices intermediate certain receiving means for transferring to and causing the accumulation in another of the entry receiving devices of the complete algebraic sum of the monomials of the polynomial term and means for controlling said last transfer means solely by said second determining means, in accordance with the conditioning thereof.

36. A calculating machine for computing and completely evaluating a polynomial expression, one term of which is itself a polynomial and for applying the rule of signs by causing changes of sign when required by such evaluation, the aforesaid polynomial term including as one of its terms a monomial composed of two factors, said machine comprising entry receiving devices for receiving the monomials of a polynomial expression, sign determining means conditioned in correspondence to the algebraic sign preceding the polynomial term, sign determining means conditioned according to the sign of the monomials, multiplying means for multiplying the monomial term factors including a receiving device for the product, means for transferring a term entered in one of said receiving devices to said product receiving device, algebraic amount transferring devices intermediate certain of the aforesaid entry receiving devices and the product receiving device for transferring to and causing the algebraic sum comprising the amount of the entire polynomial expression to be accumulated in one entry receiving device, and means for controlling said transfer devices in accumulating said algebraic sum jointly by both of said sign determining means according to the conditioning thereof.

37. A calculating machine for computing and completely evaluating a polynomial expression, one term of which is itself a polynomial and for applying the rule of signs by causing changes of sign when required by such evaluation, said machine comprising entry receiving devices for receiving the monomials of a polynomial expression, sign determining means conditioned in correspondence to the algebraic sign preceding the polynomial term, sign determining means conditioned according to the sign of the monomials, algebraic amount transferring devices intermediate certain of the aforesaid entry receiving devices for transferring to and causing the algebraic sum comprising the amount of the entire polynomial expression to be accumulated in one entry receiving device, and means for controlling said transfer devices in accumulating said algebraic sum jointly by both of said sign determining means according to the conditioning thereof.

38. In a device according to claim 37, wherein the machine is of the record controlled type and including reading means for reading monomials from records, said reading means controlling entries into the entry receiving devices, and also including recording devices brought into operation when algebraic transferring operations are completed for recording the complete evaluation of the polynomial expression, under the control of the receiving device accumulating the same, upon the record from which the monomials were derived.

39. In a device according to claim 35, wherein the machine is of the record controlled type and including reading means for reading monomials from records, said reading means controlling entries into the entry receiving devices and also including recording devices brought into operation when algebraic transferring operations are completed for recording the complete evaluation of the polynomial expression and the evaluation of the polynomial term upon the record from which the monomials were derived, and means for controlling said recording means from the receiving devices in which their respective evaluations were made.

40. In an accounting machine according to claim 34 wherein cyclic operation control means are provided and wherein said cyclic control means render said variable controls effective preliminary to the functioning of the algebraic transfer means in the course of calculating operations.

41. In an accounting machine according to claim 34 wherein the sign determining means and the sign representing means are selectively settable devices, each of which may be selectively set to plus or minus positions.

42. In an accounting machine according to claim 34 wherein record controlled means are provided for entering the terms of the polynomial expressions into the accumulators and wherein further record controlled means are provided for conditioning the setting of said sign determining and sign representing means.

43. A record controlled accounting machine, including means for reading a plurality of separate amounts from a common record, entry receiving means of accumulating type receiving such amounts under the control of the reading means, one of the accumulative type of receiving means receiving a multiplicand factor and another receiving a multiplier factor, and another receiving means receiving a third term directly from the record, means controlled by the multiplier and multiplicand factor receiving means for multiplying such factors and for setting up the product upon an accumulating device, means including algebraic transfer means for transferring the product from the accumulating device on which it is set up to the receiving means which receives the third term directly from the record for algebraically adding said product and third term in said receiving means, and means for selectively controlling the transfer means to determine the algebraic signs of transfers.

44. In an accounting machine, with cyclic operation control means, record controlled means for concurrently reading a plurality of separate amounts relating to a common problem, receiving means controlled thereby for concurrently receiving said amounts, means for algebraically transferring amounts from receiving means to receiving means following entry of items, means for controlling said transfer means for determining the algebraic sign of transfer, means conditioned prior to an entry operation and rendered effective during transferring operation by said cyclic operation control means for controlling said transfer control means whereby transfer may be effected with variable signs, record controlled means for sensing sign identifying characteristics upon the record and means controlled by said last record controlled means for controlling the conditioned means.

JAMES W. BRYCE.